(12) United States Patent
Yaji

(10) Patent No.: US 7,480,074 B2
(45) Date of Patent: Jan. 20, 2009

(54) IMAGE FORMING METHOD AND APPARATUS AND OPTICAL HEAD

(75) Inventor: Masao Yaji, Tokyo (JP)

(73) Assignee: Oki Data Corporation, Tokyo (JP)

( * ) Notice: Subject to any disclaimer, the term of this patent is extended or adjusted under 35 U.S.C. 154(b) by 555 days.

(21) Appl. No.: 10/787,815

(22) Filed: Feb. 26, 2004

(65) Prior Publication Data
US 2004/0169718 A1    Sep. 2, 2004

(30) Foreign Application Priority Data
Feb. 28, 2003    (JP) .............................. 2003-052805

(51) Int. Cl.
*H04N 1/60*    (2006.01)
(52) U.S. Cl. ..................... 358/1.9; 358/3.09; 358/1.16; 347/251; 347/238; 347/236; 372/29.02
(58) Field of Classification Search ................ 358/3.32, 358/1.9, 3.06, 3.09, 1.17, 1.18, 501; 347/131, 347/251, 238, 236, 130; 372/29.02
See application file for complete search history.

(56) References Cited

U.S. PATENT DOCUMENTS 6,292,205 B1 *   9/2001 Nakayasu et al. ........... 347/131
6,603,496 B2 *   8/2003 Nagumo et al. ............. 347/131

FOREIGN PATENT DOCUMENTS

JP       06-024042 A       2/1994

* cited by examiner

*Primary Examiner*—King Y Poon
*Assistant Examiner*—Jamares Washington
(74) *Attorney, Agent, or Firm*—Panitch Schwarze Belisario & Nadel LLP

(57) ABSTRACT

An image forming apparatus illuminates a pixel formation member with optical energy according to image data specifying a value for each pixel in the image. Some of the optical energy emitted to form a pixel is distributed over surrounding pixels; similarly, a pixel may receive peripheral optical energy that was emitted to form surrounding pixels. The amount of peripheral optical energy thus received is calculated, and the amount of optical energy emitted to form the pixel is adjusted to compensate for the peripheral optical energy, so that the total optical energy received by the pixel has the intended value. Image irregularities are thereby avoided, even if the image formation apparatus employs multiple light-emitting elements with different energy emission distributions.

12 Claims, 38 Drawing Sheets

FIG.10

| [y]\[x] | 0 | 1 | 2 | 3 | 4 | 5 | 6 | 7 | 8 |
|---|---|---|---|---|---|---|---|---|---|
| 0 | 2.19E-05 | 1.17E-04 | 3.85E-04 | 7.88E-04 | 1.00E-03 | 7.88E-04 | 3.85E-04 | 1.17E-04 | 2.19E-05 |
| 1 | 1.17E-04 | 6.22E-04 | 2.05E-03 | 4.20E-03 | 5.33E-03 | 4.20E-03 | 2.05E-03 | 6.22E-04 | 1.17E-04 |
| 2 | 3.85E-04 | 2.05E-03 | 6.77E-03 | 1.39E-02 | 1.76E-02 | 1.39E-02 | 6.77E-03 | 2.05E-03 | 3.85E-04 |
| 3 | 7.88E-04 | 4.20E-03 | 1.39E-02 | 2.89E-02 | 4.95E-02 | 2.89E-02 | 1.39E-02 | 4.20E-03 | 7.88E-04 |
| 4 | 1.00E-03 | 5.33E-03 | 1.76E-02 | 4.95E-02 | 3.90E-01 | 4.95E-02 | 1.76E-02 | 5.33E-03 | 1.00E-03 |
| 5 | 7.88E-04 | 4.20E-03 | 1.39E-02 | 2.89E-02 | 4.95E-02 | 2.89E-02 | 1.39E-02 | 4.20E-03 | 7.88E-04 |
| 6 | 3.85E-04 | 2.05E-03 | 6.77E-03 | 1.39E-02 | 1.76E-02 | 1.39E-02 | 6.77E-03 | 2.05E-03 | 3.85E-04 |
| 7 | 1.17E-04 | 6.22E-04 | 2.05E-03 | 4.20E-03 | 5.33E-03 | 4.20E-03 | 2.05E-03 | 6.22E-04 | 1.17E-04 |
| 8 | 2.19E-05 | 1.17E-04 | 3.85E-04 | 7.88E-04 | 1.00E-03 | 7.88E-04 | 3.85E-04 | 1.17E-04 | 2.19E-05 |

FIG.11

| GRAY LEVEL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| OPTICAL ENERGY [pJ] | 0.0 | 2.00 | 2.10 | 2.25 | 2.35 | 2.45 | 2.50 | 2.60 | 2.65 | 2.70 | 2.85 | 2.90 | 2.95 | 3.05 | 3.10 | 3.15 |
| GRAY LEVEL | 16 | 17 | 18 | 19 | 20 | 21 | 22 | 23 | 24 | 25 | 26 | 27 | 28 | 29 | 30 | 31 |
| OPTICAL ENERGY [pJ] | 3.15 | 3.20 | 3.30 | 3.35 | 3.40 | 3.50 | 3.60 | 3.70 | 3.80 | 3.90 | 4.10 | 4.30 | 4.50 | 4.80 | 5.30 | 6.00 |

FIG.13

| OPTICAL ENERGY (pJ) | 0.000 | 3.125 | 6.250 | 9.375 | 12.50 | 15.63 | 18.75 | ... | 7.750 | 7.781 | 7.810 | 7.844 | 7.875 | 7.910 | 7.940 | 7.970 |
|---|---|---|---|---|---|---|---|---|---|---|---|---|---|---|---|---|
| DRIVING PATTERN (HEX) | 00 | 01 | 02 | 03 | 04 | 05 | 06 | ... | f8 | f9 | fa | fb | fc | fd | fe | ff |

FIG.14

| TIMING SIGNAL | 1 | 2 | 3 | 4 | 5 | 6 | 7 | 8 |
|---|---|---|---|---|---|---|---|---|
| ILLUMINATION TIME (μs) | 10.0 | 5.00 | 2.50 | 1.25 | 0.625 | 0.313 | 0.156 | 0.0781 |

FIG.15

|   | −4 | −3 | −2 | −1 | 0 | 1 | 2 | 3 | 4 | 5 | 6 | 7 | 8 | 9 | 10 | 11 | 12 | 13 | 14 | 15 | ... |
|---|---|---|---|---|---|---|---|---|---|---|---|---|---|---|---|---|---|---|---|---|---|
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
| Dt1 | 0 | 0 | 0 | 0 | * | * | * | * | * | * | * | * | * | * | * | * | * | * | * | * | ... |
| Dt2 | 0 | 0 | 0 | 0 | * | * | * | * | * | * | * | * | * | * | * | * | * | * | * | * | ... |
| ⋮ | 0 | 0 | 0 | 0 | * | * | * | * | * | * | * | * | * | * | * | * | * | * | * | * | ... |
|   | 0 | 0 | 0 | 0 | * | * | * | * | * | * | * | * | * | * | * | * | * | * | * | * | ... |
| Dt5 | 0 | 0 | 0 | 0 | * | * | * | * | * | * | * | * | * | * | * | * | * | * | * | * | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |
|   | 0 | 0 | 0 | 0 | 0 | 0 | 0 | 0 | 0 | 0 | 0 | 0 | 0 | 0 | 0 | 0 | 0 | 0 | 0 | 0 | ... |

FIG.16

| pix<br>[0][0] | pix<br>[0][1] | pix<br>[0][2] | pix<br>[0][3] | pix<br>[0][4] | pix<br>[0][5] | pix<br>[0][6] | pix<br>[0][7] | pix<br>[0][8] |
|---|---|---|---|---|---|---|---|---|
| pix<br>[1][0] | pix<br>[1][1] | pix<br>[1][2] | pix<br>[1][3] | pix<br>[1][4] | pix<br>[1][5] | pix<br>[1][6] | pix<br>[1][7] | pix<br>[1][8] |
| pix<br>[2][0] | pix<br>[2][1] | pix<br>[2][2] | pix<br>[2][3] | pix<br>[2][4] | pix<br>[2][5] | pix<br>[2][6] | pix<br>[2][7] | pix<br>[2][8] |
| pix<br>[3][0] | pix<br>[3][1] | pix<br>[3][2] | pix<br>[3][3] | pix<br>[3][4] | pix<br>[3][5] | pix<br>[3][6] | pix<br>[3][7] | pix<br>[3][8] |
| pix<br>[4][0] | pix<br>[4][1] | pix<br>[4][2] | pix<br>[4][3] | pix<br>[4][4] | pix<br>[4][5] | pix<br>[4][6] | pix<br>[4][7] | pix<br>[4][8] |
| pix<br>[5][0] | pix<br>[5][1] | pix<br>[5][2] | pix<br>[5][3] | pix<br>[5][4] | pix<br>[5][5] | pix<br>[5][6] | pix<br>[5][7] | pix<br>[5][8] |
| pix<br>[6][0] | pix<br>[6][1] | pix<br>[6][2] | pix<br>[6][3] | pix<br>[6][4] | pix<br>[6][5] | pix<br>[6][6] | pix<br>[6][7] | pix<br>[6][8] |
| pix<br>[7][0] | pix<br>[7][1] | pix<br>[7][2] | pix<br>[7][3] | pix<br>[7][4] | pix<br>[7][5] | pix<br>[7][6] | pix<br>[7][7] | pix<br>[7][8] |
| pix<br>[8][0] | pix<br>[8][1] | pix<br>[8][2] | pix<br>[8][3] | pix<br>[8][4] | pix<br>[8][5] | pix<br>[8][6] | pix<br>[8][7] | pix<br>[8][8] |

FIG.17

| W[−4][0][0] | W[−4][0][1] | W[−4][0][2] | W[−4][0][3] | W[−4][0][4] | W[−4][0][5] | W[−4][0][6] | W[−4][0][7] | W[−4][0][8] |
|---|---|---|---|---|---|---|---|---|
| W[−4][1][0] | W[−4][1][1] | W[−4][1][2] | W[−4][1][3] | W[−4][1][4] | W[−4][1][5] | W[−4][1][6] | W[−4][1][7] | W[−4][1][8] |
| W[−4][2][0] | W[−4][2][1] | W[−4][2][2] | W[−4][2][3] | W[−4][2][4] | W[−4][2][5] | W[−4][2][6] | W[−4][2][7] | W[−4][2][8] |
| W[−4][3][0] | W[−4][3][1] | W[−4][3][2] | W[−4][3][3] | W[−4][3][4] | W[−4][3][5] | W[−4][3][6] | W[−4][3][7] | W[−4][3][8] |
| W[−4][4][0] | W[−4][4][1] | W[−4][4][2] | W[−4][4][3] | W[−4][4][4] | W[−4][4][5] | W[−4][4][6] | W[−4][4][7] | W[−4][4][8] |
| W[−4][5][0] | W[−4][5][1] | W[−4][5][2] | W[−4][5][3] | W[−4][5][4] | W[−4][5][5] | W[−4][5][6] | W[−4][5][7] | W[−4][5][8] |
| W[−4][6][0] | W[−4][6][1] | W[−4][6][2] | W[−4][6][3] | W[−4][6][4] | W[−4][6][5] | W[−4][6][6] | W[−4][6][7] | W[−4][6][8] |
| W[−4][7][0] | W[−4][7][1] | W[−4][7][2] | W[−4][7][3] | W[−4][7][4] | W[−4][7][5] | W[−4][7][6] | W[−4][7][7] | W[−4][7][8] |
| W[−4][8][0] | W[−4][8][1] | W[−4][8][2] | W[−4][8][3] | W[−4][8][4] | W[−4][8][5] | W[−4][8][6] | W[−4][8][7] | W[−4][8][8] |

FIG.18

| [y] \ [x] | 0 | 1 | 2 | 3 | 4 | 5 | 6 |
|---|---|---|---|---|---|---|---|
| 0 | 6.22E-04 | 2.05E-03 | 4.20E-03 | 5.33E-03 | 4.20E-03 | 2.05E-03 | 6.22E-04 |
| 1 | 2.05E-03 | 6.77E-03 | 1.39E-02 | 1.76E-02 | 1.39E-02 | 6.77E-03 | 2.05E-03 |
| 2 | 4.20E-03 | 1.39E-02 | 2.89E-02 | 4.95E-02 | 2.89E-02 | 1.39E-02 | 4.20E-03 |
| 3 | 5.33E-03 | 1.76E-02 | 4.95E-02 | 3.90E-01 | 4.95E-02 | 1.76E-02 | 5.33E-03 |
| 4 | 4.20E-03 | 1.39E-02 | 2.89E-02 | 4.95E-02 | 2.89E-02 | 1.39E-02 | 4.20E-03 |
| 5 | 2.05E-03 | 6.77E-03 | 1.39E-02 | 1.76E-02 | 1.39E-02 | 6.77E-03 | 2.05E-03 |
| 6 | 6.22E-04 | 2.05E-03 | 4.20E-03 | 5.33E-03 | 4.20E-03 | 2.05E-03 | 6.22E-04 |

FIG.20

| 2.19E-05 | 1.17E-04 | 3.85E-04 | 7.88E-04 | 1.00E-03 | 7.88E-04 | 3.85E-04 | 1.17E-04 | 2.19E-05 |
|---|---|---|---|---|---|---|---|---|
| 1.17E-04 | 6.22E-04 | 2.05E-03 | 4.20E-03 | 5.33E-03 | 4.20E-03 | 2.05E-03 | 6.22E-04 | 1.17E-04 |
| 3.85E-04 | 2.05E-03 | 6.77E-03 | 1.39E-02 | 1.76E-02 | 1.39E-02 | 6.77E-03 | 2.05E-03 | 3.85E-04 |
| 7.88E-04 | 4.20E-03 | 1.39E-02 | 2.89E-02 | 4.95E-02 | 2.89E-02 | 1.39E-02 | 4.20E-03 | 7.88E-04 |
| 1.00E-03 | 5.33E-03 | 1.76E-02 | 4.95E-02 | 3.90E-01 | 4.95E-02 | 1.76E-02 | 5.33E-03 | 1.00E-03 |
| 7.88E-04 | 4.20E-03 | 1.39E-02 | 2.89E-02 | 4.95E-02 | 2.89E-02 | 1.39E-02 | 4.20E-03 | 7.88E-04 |
| 3.85E-04 | 20.5E-03 | 6.77E-03 | 1.39E-02 | 1.76E-02 | 1.39E-02 | 6.77E-03 | 2.05E-03 | 3.85E-04 |
| 1.17E-04 | 6.22E-04 | 2.05E-03 | 4.20E-03 | 5.33E-03 | 4.20E-03 | 2.05E-03 | 6.22E-04 | 1.17E-04 |
| 2.19E-05 | 1.17E-04 | 3.85E-04 | 7.88E-04 | 1.00E-03 | 7.88E-04 | 3.85E-04 | 1.17E-04 | 2.19E-05 |

FIG.21

|    | -3 | -2 | -1 | 0 | 1 | 2 | 3 | 4 | 5 | 6 | 7 | 8 | 9 | 10 | 11 | 12 | 13 | 14 | 15 |
|----|----|----|----|---|---|---|---|---|---|---|---|---|---|----|----|----|----|----|----|
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
| Dt1 | 0 | 0 | 0 | * | * | * | * | * | * | * | * | * | * | * | * | * | * | * | * |
| Dt2 | 0 | 0 | 0 | * | * | * | * | * | * | * | * | * | * | * | * | * | * | * | * |
| Dt3 | 0 | 0 | 0 | * | * | * | * | * | * | * | * | * | * | * | * | * | * | * | * |
| Dt4 | 0 | 0 | 0 | * | * | * | * | * | * | * | * | * | * | * | * | * | * | * | * |
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 | 0 | 0 | 0 |
|    |   | 0 | 0 | 0 | 0 | 0 | 0 | 0 | 0 | 0 | 0 | 0 | 0 | 0 | 0 | 0 | 0 | 0 | 0 |

FIG.22

| pix<br>[0][0] | pix<br>[0][1] | pix<br>[0][2] | pix<br>[0][3] | pix<br>[0][4] | pix<br>[0][5] | pix<br>[0][6] |
|---|---|---|---|---|---|---|
| pix<br>[1][0] | pix<br>[1][1] | pix<br>[1][2] | pix<br>[1][3] | pix<br>[1][4] | pix<br>[1][5] | pix<br>[1][6] |
| pix<br>[2][0] | pix<br>[2][1] | pix<br>[2][2] | pix<br>[2][3] | pix<br>[2][4] | pix<br>[2][5] | pix<br>[2][6] |
| pix<br>[3][0] | pix<br>[3][1] | pix<br>[3][2] | pix<br>[3][3] | pix<br>[3][4] | pix<br>[3][5] | pix<br>[3][6] |
| pix<br>[4][0] | pix<br>[4][1] | pix<br>[4][2] | pix<br>[4][3] | pix<br>[4][4] | pix<br>[4][5] | pix<br>[4][6] |
| pix<br>[5][0] | pix<br>[5][1] | pix<br>[5][2] | pix<br>[5][3] | pix<br>[5][4] | pix<br>[5][5] | pix<br>[5][6] |
| pix<br>[6][0] | pix<br>[6][1] | pix<br>[6][2] | pix<br>[6][3] | pix<br>[6][4] | pix<br>[6][5] | pix<br>[6][6] |

FIG.23

| W[-3]<br>[0][0] | W[-3]<br>[0][1] | W[-3]<br>[0][2] | W[-3]<br>[0][3] | W[-3]<br>[0][4] | W[-3]<br>[0][5] | W[-3]<br>[0][6] |
|---|---|---|---|---|---|---|
| W[-3]<br>[1][0] | W[-3]<br>[1][1] | W[-3]<br>[1][2] | W[-3]<br>[1][3] | W[-3]<br>[1][4] | W[-3]<br>[1][5] | W[-3]<br>[1][6] |
| W[-3]<br>[2][0] | W[-3]<br>[2][1] | W[-3]<br>[2][2] | W[-3]<br>[2][3] | W[-3]<br>[2][4] | W[-3]<br>[2][5] | W[-3]<br>[2][6] |
| W[-3]<br>[3][0] | W[-3]<br>[3][1] | W[-3]<br>[3][2] | W[-3]<br>[3][3] | W[-3]<br>[3][4] | W[-3]<br>[3][5] | W[-3]<br>[3][6] |
| W[-3]<br>[4][0] | W[-3]<br>[4][1] | W[-3]<br>[4][2] | W[-3]<br>[4][3] | W[-3]<br>[4][4] | W[-3]<br>[4][5] | W[-3]<br>[4][6] |
| W[-3]<br>[5][0] | W[-3]<br>[5][1] | W[-3]<br>[5][2] | W[-3]<br>[5][3] | W[-3]<br>[5][4] | W[-3]<br>[5][5] | W[-3]<br>[5][6] |
| W[-3]<br>[6][0] | W[-3]<br>[6][1] | W[-3]<br>[6][2] | W[-3]<br>[6][3] | W[-3]<br>[6][4] | W[-3]<br>[6][5] | W[-3]<br>[6][6] |

FIG.25

|     |   | [x]      |          |          |          |          |
|-----|---|----------|----------|----------|----------|----------|
|     |   | 0        | 1        | 2        | 3        | 4        |
| [y] | 0 | 1.15E-02 | 1.39E-02 | 1.76E-02 | 1.39E-02 | 1.15E-02 |
|     | 1 | 1.80E-02 | 2.89E-02 | 4.95E-02 | 2.89E-02 | 1.80E-02 |
|     | 2 | 1.76E-02 | 4.95E-02 | 3.90E-02 | 4.95E-02 | 2.29E-02 |
|     | 3 | 1.80E-02 | 2.89E-02 | 4.95E-02 | 2.89E-02 | 1.80E-02 |
|     | 4 | 1.15E-02 | 1.80E-02 | 2.29E-02 | 1.80E-02 | 1.15E-02 |

FIG.26

| 113 | 117 | 186 | 234 | 234 | 235 | 230 |
|-----|-----|-----|-----|-----|-----|-----|
| 107 | 135 | 223 | 235 | 235 | 230 | 223 |
| 100 | 156 | 231 | 242 | 243 | 241 | 235 |
| 110 | 201 | 240 | 249 | 245 | 241 | 234 |
| 147 | 234 | 243 | 247 | 243 | 235 | 216 |
| 184 | 240 | 212 | 243 | 239 | 224 | 170 |
| 225 | 242 | 238 | 243 | 234 | 202 | 132 |

FIG.27

|  | (1) | | (2) | (3) | (4) | | (5) |
|---|---|---|---|---|---|---|---|
|  | W1[0][0] | W1[0][1] | W1[0][2] | W1[0][3] | W1[0][4] | W1[0][5] | W1[0][6] |
|  | W1[1][0] | W1[1][1] | W1[1][2] | W1[1][3] | W1[1][4] | W1[1][5] | W1[1][6] |
| (16) | W1[2][0] | W1[2][1] | W1[2][2] | W1[2][3] | W1[2][4] | W1[2][5] | W1[2][6] | (6) |
| (15) | W1[3][0] | W1[3][1] | W1[3][2] | W1[3][3] | W1[3][4] | W1[3][5] | W[3][6] | (7) |
| (14) | W1[4][0] | W1[4][1] | W1[4][2] | W1[4][3] | W1[4][4] | W1[4][5] | W1[4][6] | (8) |
|  | W1[5][0] | W1[5][1] | W1[5][2] | W1[5][3] | W1[5][4] | W1[5][5] | W1[5][6] |
|  | W1[6][0] | W1[6][1] | W1[6][2] | W1[6][3] | W1[6][4] | W[6][5] | W1[6][6] |
|  | (13) | | (12) | (11) | (10) | | (9) |

FIG.28

|  | (1) | (2) | (3) | (4) | (5) |
|---|---|---|---|---|---|
|  | W2[0][0] | W2[0][1] | W2[0][2] | W2[0][3] | W2[0][4] |
| (16) | W2[1][0] | W2[1][1] | W2[1][2] | W2[1][3] | W2[1][4] | (6) |
| (15) | W2[2][0] | W2[2][1] | W2[2][2] | W2[2][3] | W2[2][4] | (7) |
| (14) | W2[3][0] | W2[3][1] | W2[3][2] | W2[3][3] | W2[3][4] | (8) |
|  | W2[4][0] | W2[4][1] | W2[4][2] | W2[4][3] | W2[4][4] |
|  | (13) | (12) | (11) | (10) | (9) |

FIG.29

|     | −2 | −1 | 0 | 1 | 2 | 3 | 4 | 5 | 6 | 7 | 8 | 9 | 10 | 11 | 12 | 13 | 14 | 15 |     |
|-----|----|----|---|---|---|---|---|---|---|---|---|---|----|----|----|----|----|----|-----|
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |
| Dt1 | 0  | 0  | * | * | * | * | * | * | * | * | * | * | *  | *  | *  | *  | *  | *  | ---- |
| Dt2 | 0  | 0  | * | * | * | * | * | * | * | * | * | * | *  | *  | *  | *  | *  | *  | ---- |
| Dt3 | 0  | 0  | * | * | * | * | * | * | * | * | * | * | *  | *  | *  | *  | *  | *  | ---- |
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |
|     | 0  | 0  | 0 | 0 | 0 | 0 | 0 | 0 | 0 | 0 | 0 | 0 | 0  | 0  | 0  | 0  | 0  | 0  | ---- |

FIG.30

| pix[0][0] | pix[0][1] | pix[0][2] | pix[0][3] | pix[0][4] |
|-----------|-----------|-----------|-----------|-----------|
| pix[1][0] | pix[1][1] | pix[1][2] | pix[1][3] | pix[1][4] |
| pix[2][0] | pix[2][1] | pix[2][2] | pix[2][3] | pix[2][4] |
| pix[3][0] | pix[3][1] | pix[3][2] | pix[3][3] | pix[3][4] |
| pix[4][0] | pix[4][1] | pix[4][2] | pix[4][3] | pix[4][4] |

FIG.31

| W[-2][0][0] | W[-2][0][1] | W[-2][0][2] | W[-2][0][3] | W[-2][0][4] |
|---|---|---|---|---|
| W[-2][1][0] | W[-2][1][1] | W[-2][1][2] | W[-2][1][3] | W[-2][1][4] |
| W[-2][2][0] | W[-2][2][1] | W[-2][2][2] | W[-2][2][3] | W[-2][2][4] |
| W[-2][3][0] | W[-2][3][1] | W[-2][3][2] | W[-2][3][3] | W[-2][3][4] |
| W[-2][4][0] | W[-2][4][1] | W[-2][4][2] | W[-2][4][3] | W[-2][4][4] |

FIG.33

| [y]\[x] | 0 | 1 | 2 | 3 | 4 | 5 | 6 | 7 | 8 |
|---|---|---|---|---|---|---|---|---|---|
| 0 | −2.90E-06 | −1.54E-05 | −5.10E-05 | −1.04E-04 | −1.32E-04 | −1.04E-04 | −5.10E-05 | −1.54E-05 | −2.90E-06 |
| 1 | −1.54E-05 | −8.23E-05 | −2.71E-04 | −5.55E-04 | −7.05E-04 | −5.55E-04 | −2.71E-04 | −8.23E-05 | −1.54E-05 |
| 2 | −5.10E-05 | −2.71E-04 | −8.95E-04 | −1.83E-03 | −2.32E-03 | −1.83E-03 | −8.95E-04 | −2.71E-04 | −5.10E-05 |
| 3 | −1.04E-04 | −5.55E-04 | −1.83E-03 | −2.87E-03 | 4.88E-03 | −2.87E-03 | −1.83E-03 | −5.55E-04 | −1.04E-04 |
| 4 | −1.32E-04 | −7.05E-04 | −2.32E-03 | 4.88E-03 | 3.13E-02 | 4.88E-03 | −2.32E-03 | −7.05E-04 | −1.32E-04 |
| 5 | −1.04E-04 | −5.55E-04 | −1.83E-03 | −2.87E-03 | 4.88E-03 | −2.87E-03 | −1.83E-03 | −5.55E-04 | −1.04E-04 |
| 6 | −5.10E-05 | −2.71E-04 | −8.95E-04 | −1.83E-03 | −2.32E-03 | −1.83E-03 | −8.95E-04 | −2.71E-04 | −5.10E-05 |
| 7 | −1.54E-05 | −8.23E-05 | −2.71E-04 | −5.55E-04 | −7.05E-04 | −5.55E-04 | −2.71E-04 | −8.23E-05 | −1.54E-05 |
| 8 | −2.90E-06 | −1.54E-05 | −5.10E-05 | −1.04E-04 | −1.32E-04 | −1.04E-04 | −5.10E-05 | −1.54E-05 | −2.90E-06 |

FIG.40

| [y] \ [x] | 0 | 1 | 2 | 3 | 4 | 5 | 6 |
|---|---|---|---|---|---|---|---|
| 0 | 3.75E-04 | 1.30E-03 | 2.75E-03 | 3.52E-03 | 2.75E-03 | 1.30E-03 | 3.75E-04 |
| 1 | 1.30E-03 | 4.52E-03 | 9.53E-03 | 1.22E-02 | 9.53E-03 | 4.52E-03 | 1.30E-03 |
| 2 | 2.75E-03 | 9.53E-03 | 2.01E-02 | 2.65E-02 | 2.01E-02 | 9.53E-03 | 2.75E-03 |
| 3 | 3.52E-03 | 1.22E-02 | 2.65E-02 | 6.22E-01 | 2.65E-02 | 1.22E-02 | 3.52E-03 |
| 4 | 2.75E-03 | 9.53E-03 | 2.01E-02 | 2.65E-02 | 2.01E-02 | 9.53E-03 | 2.75E-03 |
| 5 | 1.30E-03 | 4.52E-03 | 9.53E-03 | 1.22E-02 | 9.53E-03 | 4.52E-03 | 1.30E-03 |
| 6 | 3.75E-04 | 1.30E-03 | 2.75E-03 | 3.52E-03 | 2.75E-03 | 1.30E-03 | 3.75E-04 |

FIG.41

| W<br>[0][0] | W<br>[0][1] | W<br>[0][2] | W<br>[0][3] | W<br>[0][4] | W<br>[0][5] | W<br>[0][6] |
|---|---|---|---|---|---|---|
| W<br>[1][0] | W<br>[1][1] | W<br>[1][2] | W<br>[1][3] | W<br>[1][4] | W<br>[1][5] | W<br>[1][6] |
| W<br>[2][0] | W<br>[2][1] | W<br>[2][2] | W<br>[2][3] | W<br>[2][4] | W<br>[2][5] | W<br>[2][6] |
| W<br>[3][0] | W<br>[3][1] | W<br>[3][2] | W<br>[3][3] | W<br>[3][4] | W<br>[3][5] | W<br>[3][6] |
| W<br>[4][0] | W<br>[4][1] | W<br>[4][2] | W<br>[4][3] | W<br>[4][4] | W<br>[4][5] | W<br>[4][6] |
| W<br>[5][0] | W<br>[5][1] | W<br>[5][2] | W<br>[5][3] | W<br>[5][4] | W<br>[5][5] | W<br>[5][6] |
| W<br>[6][0] | W<br>[6][1] | W<br>[6][2] | W<br>[6][3] | W<br>[6][4] | W<br>[6][5] | W<br>[6][6] |

FIG.42

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 31 | 31 | 31 | 31 | 31 | 31 | 31 |
| 0 | 0 | 0 | 31 | 31 | 31 | 31 | 31 | 31 | 31 |
| 0 | 0 | 0 | 31 | 31 | 31 | 31 | 31 | 31 | 31 |
| 0 | 0 | 0 | 31 | 31 | 31 | 31 | 31 | 31 | 31 |
| 0 | 0 | 0 | 31 | 31 | 31 | 31 | 31 | 31 | 31 |
| 0 | 0 | 0 | 31 | 31 | 31 | 31 | 31 | 31 | 31 |
| 0 | 0 | 0 | 31 | 31 | 31 | 31 | 31 | 31 | 31 | p1 → (leftmost 31 in row 4); AR1 label points to region

FIG.43

| 6.00 | 6.00 | 6.00 | 6.00 |
|------|------|------|------|
| 6.00 | 6.00 | 6.00 | 6.00 |
| 6.00 | 6.00 | 6.00 | 6.00 |
| 6.00 | 6.00 | 6.00 | 6.00 |

FIG.44

| 3.75e-4 | 1.30e-3 | 2.75e-3 | 3.52e-3 | 2.75e-3 | 1.30e-3 | 3.75e-4 |
|---------|---------|---------|---------|---------|---------|---------|
| 1.30e-3 | 4.52e-3 | 9.53e-3 | 1.22e-2 | 9.53e-3 | 4.52e-3 | 1.30e-3 |
| 2.75e-3 | 9.53e-3 | 2.01e-2 | 2.65e-2 | 2.01e-2 | 9.53e-3 | 2.75e-3 |
| 3.52e-3 | 1.22e-2 | 2.65e-2 | 6.22e-1 | 2.65e-2 | 1.22e-2 | 3.52e-3 |
| 2.75e-3 | 9.53e-3 | 2.01e-2 | 2.65e-2 | 2.01e-2 | 9.53e-3 | 2.75e-3 |
| 1.30e-3 | 4.52e-3 | 9.53e-3 | 1.22e-2 | 9.53e-3 | 4.52e-3 | 1.30e-3 |
| 3.75e-4 | 1.30e-3 | 2.75e-3 | 3.52e-3 | 2.75e-3 | 1.30e-3 | 3.75e-4 |

FIG.45

| 3.73<br>=6.0 *<br>6.22e-1 | 0.159<br>=6.0 *<br>2.65e-2 | 0.0732<br>=6.0 *<br>1.22e-2 | 0.02112<br>=6.0 *<br>3.52e-3 |
|---|---|---|---|
| 0.159<br>=6.0 *<br>2.65e-2 | 0.1206<br>=6.0 *<br>2.01e-2 | 0.05718<br>=6.0 *<br>9.53e-3 | 0.0165<br>=6.0 *<br>2.75e-3 |
| 0.0732<br>=6.0 *<br>1.22e-2 | 0.05718<br>=6.0 *<br>9.53e-3 | 0.02712<br>=6.0 *<br>4.52e-3 | 0.0078<br>=6.0 *<br>1.30e-3 |
| 0.02112<br>=6.0 *<br>3.52e-3 | 0.0165<br>=6.0 *<br>2.75e-3 | 0.0078<br>=6.0 *<br>1.30e-3 | 0.00225<br>=6.0 *<br>3.75e-4 |

FIG.46

| 8.325 | 7.756 | 7.490 | 7.414 |
|---|---|---|---|
| 7.756 | 6.994 | 6.636 | 6.533 |
| 7.490 | 6.636 | 6.235 | 6.119 |
| 7.414 | 6.533 | 6.119 | 6.000 |

FIG.47

| 3.75e-4 | 1.30e-3 | 2.75e-3 | 3.52e-3 | 2.75e-3 | 1.30e-3 | 3.75e-4 |
|---------|---------|---------|---------|---------|---------|---------|
| 1.30e-3 | 4.52e-3 | 9.53e-3 | 1.22e-2 | 9.53e-3 | 4.52e-3 | 1.30e-3 |
| 2.75e-3 | 9.53e-3 | 2.01e-2 | 2.65e-2 | 2.01e-2 | 9.53e-3 | 2.75e-3 |
| 3.52e-3 | 1.22e-2 | 2.65e-2 | 6.22e-1 | 2.65e-2 | 1.22e-2 | 3.52e-3 |
| 2.75e-3 | 9.53e-3 | 2.01e-2 | 2.65e-2 | 2.01e-2 | 9.53e-3 | 2.75e-3 |
| 1.30e-3 | 4.52e-3 | 9.53e-3 | 1.22e-2 | 9.53e-3 | 4.52e-3 | 1.30e-3 |
| 3.75e-4 | 1.30e-3 | 2.75e-3 | 3.52e-3 | 2.75e-3 | 1.30e-3 | 3.75e-4 |

FIG. 48

| 3.43e-4 | 1.12e-3 | 2.23e-3 | 2.70e-3 | 1.98e-3 | 8.87e-3 | 2.41e-4 |
|---|---|---|---|---|---|---|
| 1.12e-3 | 3.67e-3 | 7.30e-3 | 8.83e-3 | 6.49e-3 | 2.90e-3 | 7.88-e4 |
| 2.23e-3 | 7.30e-3 | 1.46e-2 | 2.06e-2 | 1.29e-2 | 5.77e-3 | 1.57e-3 |
| 2.70e-3 | 8.83e-3 | 2.06e-2 | 5.10e-1 | 1.58e-2 | 6.98e-2 | 1.90e-3 |
| 1.98e-3 | 6.49e-3 | 1.29e-2 | 1.58e-2 | 1.15e-2 | 5.13e-3 | 1.39e-3 |
| 8.87e-4 | 2.90e-3 | 5.77e-3 | 6.98e-3 | 5.13e-3 | 2.29e-3 | 6.23e-4 |
| 2.41e-4 | 7.88e-4 | 1.57e-3 | 1.90e-3 | 1.39e-3 | 6.23e-4 | 1.69e-4 |

FIG. 49

| 3.73<br>=6.0 *<br>6.22e-1 | 0.159<br>=6.0 *<br>2.65e-2 | 0.0732<br>=6.0 *<br>1.22e-2 | 0.0162<br>=6.0 *<br>2.70e-3 |
|---|---|---|---|
| 0.159<br>=6.0 *<br>2.65e-2 | 0.1206<br>=6.0 *<br>2.01e-2 | 0.05718<br>=6.0 *<br>9.53e-3 | 0.01338<br>=6.0 *<br>2.23e-3 |
| 0.0732<br>=6.0 *<br>1.22e-2 | 0.05718<br>=6.0 *<br>9.53e-3 | 0.02712<br>=6.0 *<br>4.52e-3 | 0.00672<br>=6.0 *<br>1.12e-3 |
| 0.02112<br>=6.0 *<br>3.52e-3 | 0.0165<br>=6.0 *<br>2.75e-3 | 0.0078<br>=6.0 *<br>1.30e-3 | 0.00206<br>=6.0 *<br>3.43e-4 |

FIG.50

|   |   |   |   |   |   |   |   |   |   |   |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 31 | 31 | 31 | 31 | 31 | 31 | 31 | 31 |
| 0 | 0 | 0 | 31 | 31 | 31 | 31 | 31 | 31 | 31 | 31 |
| 0 | 0 | 0 | 31 | 31 | 31 | 31 | 31 | 31 | 31 | 31 |
| 0 | 0 | 0 | 31 | 31 | 31 | 31 | 31 | 31 | 31 | 31 |
| 0 | 0 | 0 | 31 | 31 | 31 | 31 | 31 | 31 | 31 | 31 |
| 0 | 0 | 0 | 31 | 31 | 31 | 31 | 31 | 31 | 31 | 31 |
| 0 | 0 | 0 | 31 | 31 | 31 | 31 | 31 | 31 | 31 | 31 | p2, AR2

FIG.51

| 6.00 | 6.00 | 6.00 | 6.00 | 6.00 | 6.00 | 6.00 |
|------|------|------|------|------|------|------|
| 6.00 | 6.00 | 6.00 | 6.00 | 6.00 | 6.00 | 6.00 |
| 6.00 | 6.00 | 6.00 | 6.00 | 6.00 | 6.00 | 6.00 |
| 6.00 | 6.00 | 6.00 | 6.00 | 6.00 | 6.00 | 6.00 |

FIG.52

| 0.02112<br>=6.0 *<br>3.52e-3 | 0.0732<br>=6.0 *<br>1.22e-2 | 0.159<br>=6.0 *<br>2.65e-2 | 3.06<br>=6.0 *<br>5.10e-1 | 0.159<br>=6.0 *<br>2.65e-2 | 0.0732<br>=6.0 *<br>1.22e-2 | 0.02112<br>=6.0 *<br>3.52e-3 |
|---|---|---|---|---|---|---|
| 0.0165<br>=6.0 *<br>2.75e-3 | 0.05718<br>=6.0 *<br>9.53e-3 | 0.1206<br>=6.0 *<br>2.01e-2 | 0.1236<br>=6.0 *<br>2.06e-2 | 0.1206<br>=6.0 *<br>2.01e-2 | 0.05718<br>=6.0 *<br>9.53e-3 | 0.0165<br>=6.0 *<br>2.75e-3 |
| 0.0078<br>=6.0 *<br>1.30e-3 | 0.02712<br>=6.0 *<br>4.52e-3 | 0.05718<br>=6.0 *<br>9.53e-3 | 0.05298<br>=6.0 *<br>8.83e-3 | 0.05718<br>=6.0 *<br>9.53e-3 | 0.02712<br>=6.0 *<br>4.52e-3 | 0.0078<br>=6.0 *<br>1.30e-3 |
| 0.00225<br>=6.0 *<br>3.75e-4 | 0.0078<br>=6.0 *<br>1.30e-3 | 0.0165<br>=6.0 *<br>2.75e-3 | 0.0162<br>=6.0 *<br>2.70e-3 | 0.0165<br>=6.0 *<br>2.75e-3 | 0.0078<br>=6.0 *<br>1.30e-3 | 0.00225<br>=6.0 *<br>3.75e-4 |

FIG.53

| 8.339 | 7.897 | 7.628 | 9.156 | 7.624 | 7.520 | 7.447 |
|---|---|---|---|---|---|---|
| 7.778 | 7.087 | 6.843 | 8.209 | 6.929 | 6.682 | 6.579 |
| 7.517 | 6.745 | 6.478 | 7.766 | 6.455 | 6.289 | 6.172 |
| 7.441 | 6.647 | 6.374 | 7.640 | 6.349 | 6.177 | 6.055 |

IMAGE FORMING METHOD AND APPARATUS AND OPTICAL HEAD

BACKGROUND OF THE INVENTION

1. Field of the Invention

The present invention relates to an image forming method and apparatus and an optical head.

2. Description of the Related Art

Electrophotographic image forming apparatus that forms a latent electrostatic image on a photosensitive member such as a photosensitive drum and develops the image by application of toner is known from conventional printers, copiers, and facsimile machines. Known types of electrophotographic printers include laser printers, light-emitting diode (LED) printers, and liquid crystal printers. An LED printer includes a print head, also referred to as an optical head or LED head, comprising one or more LED array chips providing a linear array of light-emitting diodes (LEDs), a rod lens array for focusing the light emitted by the LEDs, and driver circuitry for selectively driving the LEDs. This type of print head has a simple structure and an easily alignable optical system, as explained in, for example, Japanese Patent No. 2,766,431.

A problem that occurs in LED printers is that different LEDs may emit optical energy with different spatial distributions. These variations in energy emission distribution can cause printing irregularities.

An ideal energy emission distribution is shown in cross section in FIG. 1, in which the horizontal axis denotes position on the emitting surface of an LED array chip and the vertical axis denotes emitted optical energy or power. Curves L1 and L2 are two Gaussian distributions, L1 being comparatively peaked and L2 comparatively flat. Curve L3 is the sum of distributions L1 and L2. The ideal emission distribution of optical energy emitted from an LED is similar to curve L3, but in practice, the shape of the curve or the area under the curve, indicating the shape of the distribution or the total energy emitted, tends to vary from one LED to another. Possible sources of variation include, for example, optical variations in the lenses, variations in the optical output of the LEDs, variations in the electrical characteristics of the circuits that drive the LEDs, and variations due to the positions of the LEDs in the LED array chips.

A first example of the emission distribution Ds1 of an LED is shown in plan view in FIG. 2; a second example Ds2 is shown in FIG. 3. If these distributions Ds1, Ds2 belong to adjacent LEDs that are driven one after the other in two consecutive dot lines, the distributions may overlap as shown in FIG. 4 or fail to overlap as shown in as in FIG. 5, depending on which LED is driven first. Profiles of the combined distributions are shown in FIG. 6, in which the horizontal axis indicates position on line X-X in FIG. 4, and FIG. 7, in which the horizontal axis indicates position on line Y-Y in FIG. 5. The vertical axis in FIGS. 6 and 7 indicates optical power; $\rho$ indicates a threshold level for image formation. The two distributions shown in FIGS. 4 and 5 reinforce each other in FIG. 6, but fail to do so in FIG. 7.

More specifically, in FIG. 6, area a of distribution Ds1 overlaps areas b and d of distribution Ds2, and area b of distribution Ds2 overlaps areas a and c of distribution Ds1, causing the optical power of the combined distribution to exceed the threshold value $\rho$ in the region between the two distributions Ds1 and Ds2 so that the two LEDs form a joined pair of dots.

In FIG. 7, however, areas a fail to overlap, and they also fail to overlap areas c and d, so when the two distributions are combined, the optical power does not exceed the threshold value $\rho$ between the two distributions Ds1 and Ds2, and the two LEDs form a pair of isolated dots.

This situation is troublesome when image data with multiple gray levels are printed by dithering. If the dither matrix leads to the driving of LEDs with energy emission distributions Ds1 and Ds2 in the pattern shown in FIG. 4, the printed image may appear darker than intended. Conversely, if the dither matrix leads to the driving of LEDs with energy emission distributions Ds1 and Ds2 in the pattern shown in FIG. 5, the printed image may appear lighter than intended.

Irregularities also occur when multiple gray levels are printed by controlling the amount of optical energy emitted by each LED. For example, the combined distribution in FIG. 7 may cause white flecks to appear in an area that should be all black.

The dashed lines in FIGS. 4 and 5 indicate the basic resolution or dot pitch of the LED printer. Ideally, the emission distribution of each LED should be indicated by concentric circles centered within the dotted cells, but in practice the distributions may be eccentric and elliptical, as shown. Even if the total optical output of each LED is adjusted to the same level, FIGS. 4 and 5 show that emission distribution variations can lead to uneven density in printed images and therefore to lowered printing quality.

It would be desirable if these printed density variations could be avoided despite differences in the emission distributions of different LEDs.

SUMMARY OF THE INVENTION

According to the present invention, when an image is formed by illuminating a pixel formation member with optical energy according to image data specifying a value for each pixel in the image, the peripheral optical energy received by each pixel is calculated, the peripheral optical energy being optical energy received from light emitted to form surrounding pixels. The optical energy emitted to form each pixel is then adjusted as necessary to compensate for the calculated peripheral optical energy, so that each pixel receives the intended total amount of optical energy.

The invention also provides an image forming apparatus and an optical head employing this method of image formation. Besides computational units for calculating the peripheral optical energy and performing compensation, the image forming apparatus or optical head may include a memory for storing energy emission distribution data.

The peripheral optical energy may be calculated on the basis of a single assumed energy emission distribution indicating how the optical energy emitted to form a given pixel is distributed over an area including the given pixel and surrounding pixels. If the image formation apparatus or optical head has a plurality of light emitting elements, the single assumed distribution may be an average distribution for the plurality of light emitting elements.

Alternatively, the actual energy emission distribution of each light emitting element may be determined by measurement when the image formation apparatus or optical head is manufactured, and the actual distribution data for each light emitting element may be stored in the memory and used in the peripheral optical energy calculation. In this case, the calculation may include not only peripheral optical energy but also the optical energy emitted to form the pixel under consideration, so as to compensate not only for the effect of peripheral illumination but also for differences in the amount of optical energy delivered by each light emitting element to the pixels the light emitting element is intended to illuminate.

When the energy emission distributions of individual light emitting elements are used, various schemes may be adopted to reduce the amount of distribution data. In one scheme, the distribution data are stored in matrices of the minimum size such that the sum of the data omitted from the matrix amounts to, for example, less than one gray level in the gray scale of the image forming apparatus or optical head.

To further reduce the amount of distribution data, data for a comparatively small number of distributions may be stored, and each light emitting element may be indexed to the most closely matching stored distribution.

Alternatively, each of the outermost data values in a distribution matrix represents optical energy distributed to a plurality of pixels.

In another alternative scheme, a single standard distribution is stored, together with deviation data indicating deviations of the actual energy emission distributions from the standard distribution.

By adjusting the optical energy emitted to form a pixel according to the energy emission distribution data, the present invention can avoid uneven image density and improve the quality even of images including isolated black dots, thin lines, white dots, white lines, and other components with high spatial frequencies.

BRIEF DESCRIPTION OF THE DRAWINGS

In the attached drawings:

FIG. 10 shows exemplary energy emission distribution data used in the first embodiment;

FIG. 11 shows an example of a table for converting gray levels to optical energy in the first embodiment;

FIG. 13 shows an example of a table for converting optical energy to an LED driving pattern in the first embodiment;

FIG. 14 shows exemplary data stored in the strobe time register file in the first embodiment;

FIG. 15 illustrates data stored in the image data line buffer during operation of the first embodiment;

FIG. 16 illustrates a matrix in the optical energy matrix buffer in the first embodiment;

FIG. 17 illustrates a matrix in the energy emission distribution matrix buffer in the first embodiment;

FIG. 18 shows an example of energy emission distribution data used in a second embodiment of the invention;

FIG. 20 indicates the part of the distribution in FIG. 10 omitted from the distribution in FIG. 18;

FIG. 21 illustrates data stored in the image data line buffer during operation of the second embodiment;

FIG. 22 illustrates a matrix in the optical energy matrix buffer in the second embodiment;

FIG. 23 illustrates a matrix in the energy emission distribution matrix buffer in the second embodiment;

FIG. 25 shows an example of energy emission distribution data used in a fourth embodiment of the invention;

FIG. 26 is a diagram showing exemplary image data in the fourth embodiment;

FIG. 27 illustrates the compression of optical energy distribution data in the fourth embodiment;

FIG. 28 illustrates compressed optical energy distribution data in the fourth embodiment;

FIG. 29 illustrates data stored in the image data line buffer during operation of the fourth embodiment;

FIG. 30 illustrates a matrix in the optical energy matrix buffer in the fourth embodiment;

FIG. 31 illustrates a matrix in the energy emission distribution matrix buffer in the fourth embodiment;

FIG. 33 shows an example of energy emission distribution data used in the fifth embodiment;

FIG. 40 shows an example of an average energy emission distribution used in the seventh embodiment;

FIG. 41 illustrates the average energy emission distribution matrix buffer in the seventh embodiment;

FIG. 42 illustrates data stored in the image data line buffer during operation of the seventh embodiment;

FIG. 43 illustrates part of the data in FIG. 42 converted to optical energy values;

FIG. 44 shows the data in FIG. 40 as stored in the average energy emission distribution matrix buffer in the seventh embodiment;

FIG. 45 illustrates the calculation of peripheral optical energy components from the data in FIGS. 43 and 44;

FIG. 46 shows an example of optimum optical energy values in the seventh embodiment;

FIGS. 47 and 48 show examples of differing energy emission distributions in the second embodiment;

FIG. 49 illustrates the calculation of peripheral optical energy components from the data in FIGS. 43, 47, and 48;

FIG. 50 illustrates data stored in the image data line buffer during operation of the second embodiment;

FIG. 51 illustrates part of the data in FIG. 50 converted to optical energy values;

FIG. 52 illustrates the calculation of peripheral optical energy components from the data in FIGS. 47, 48, 50, and 51;

FIG. 53 shows another example of optimum optical energy values in the second embodiment;

DETAILED DESCRIPTION OF THE INVENTION

Figure 1:
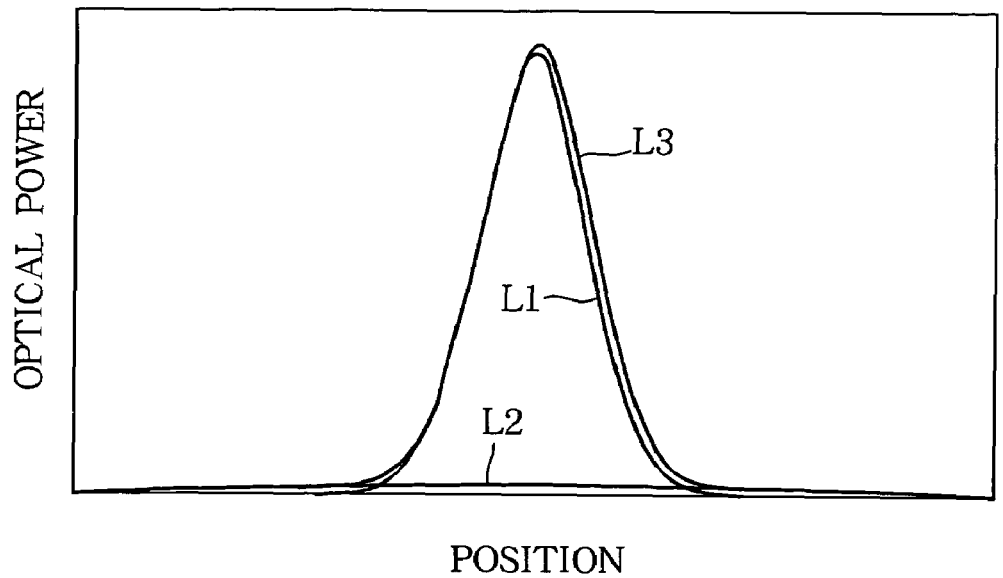
FIG. 1 shows a profile of the energy emission distribution of an ideal LED.
Figure 2:
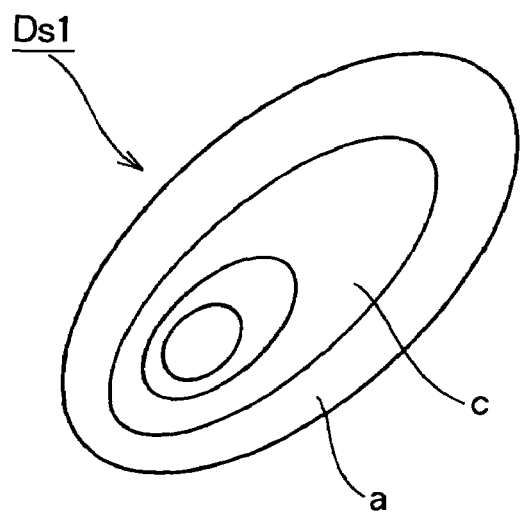
FIGS. 2 and 3 show plan views of two examples of actual LED energy emission distributions.
Figure 3:
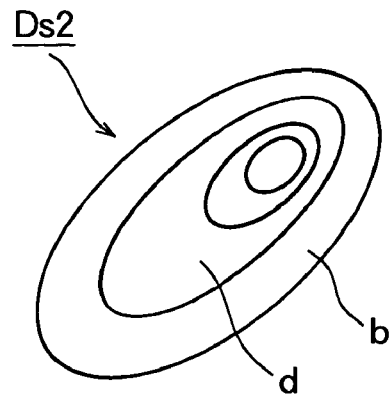
Figure 4:
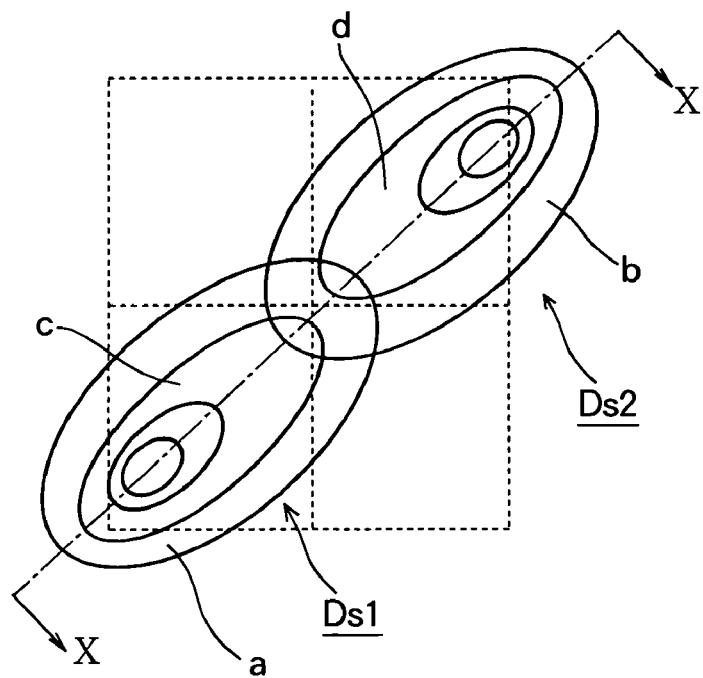
FIGS. 4 and 5 show plan views of two combinations of the energy distributions in FIGS. 2 and 3 to form diagonally adjacent dots.
Figure 5:
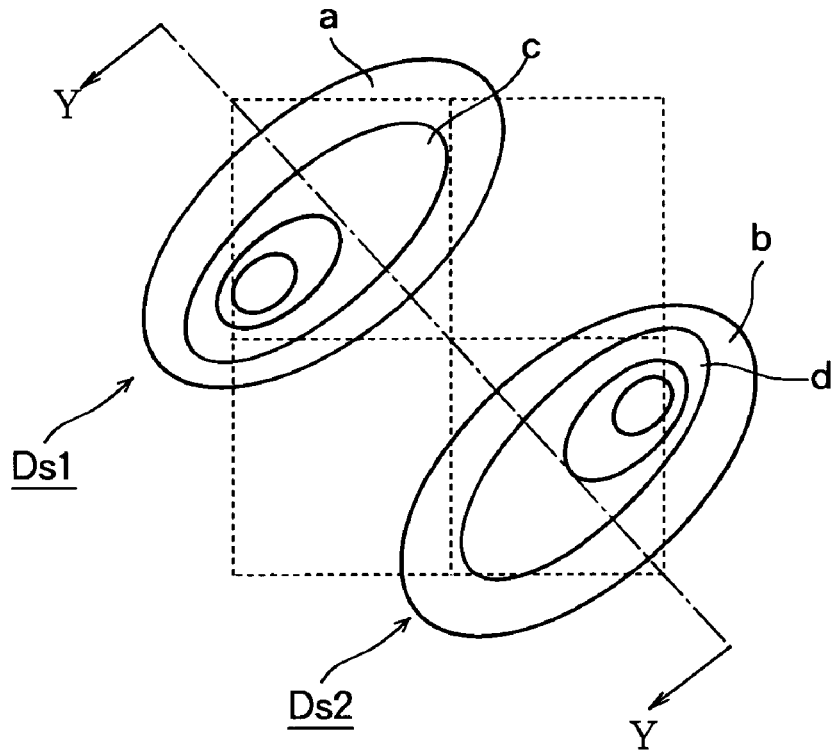
Figure 6:
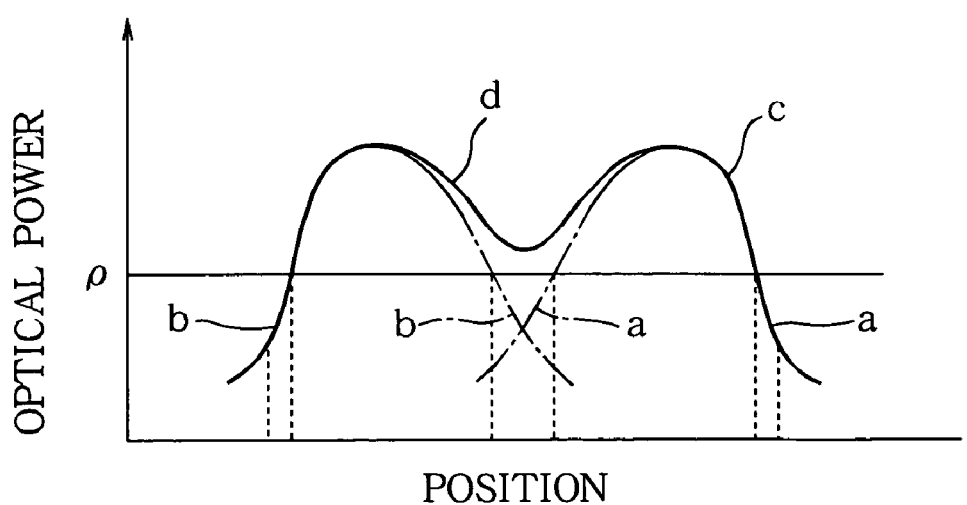
FIG. 6 shows a profile of the energy distribution on line X-X in FIG. 4.
Figure 7:
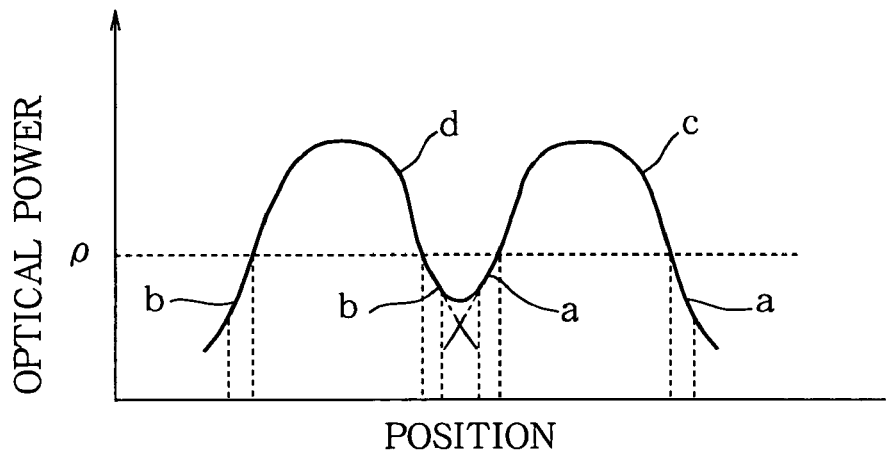
FIG. 7 shows a profile of the energy distribution on line Y-Y in FIG. 5.

Embodiments of the invention will now be described with reference to the attached drawings, in which like elements are indicated by like reference characters. The image forming apparatus in these embodiments is an electrophotographic printer.

Figure 8:
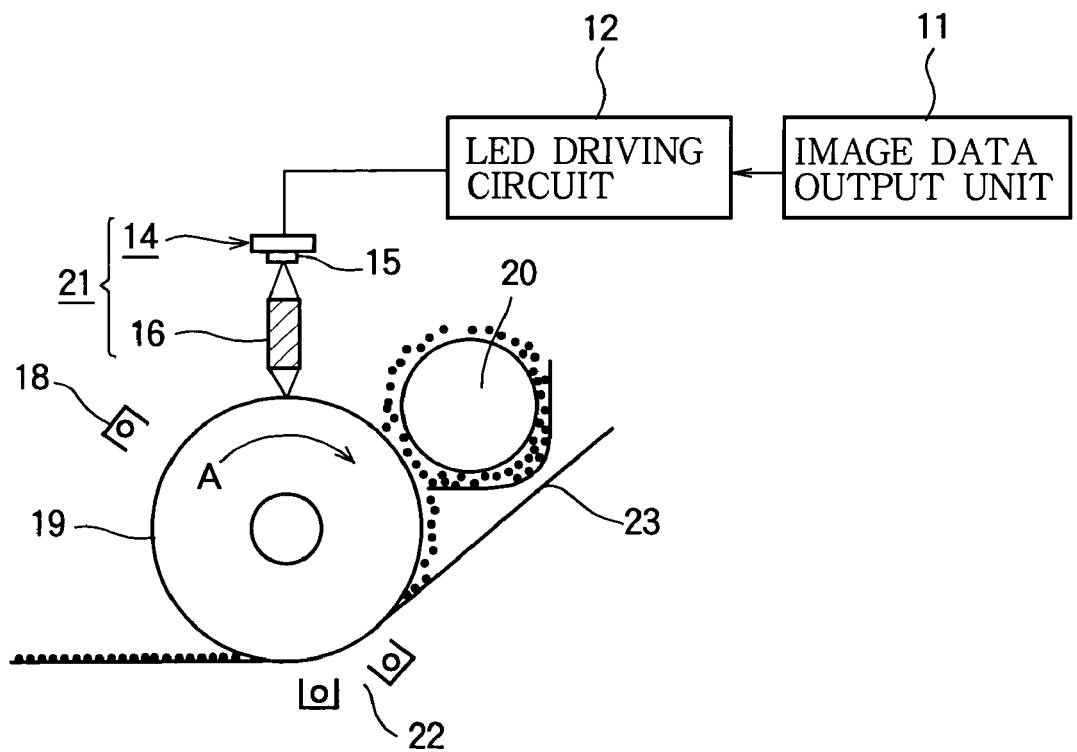
FIG. 8 is a schematic drawing of an LED printer in which the present invention may be employed.

FIG. 8 schematically illustrates the first embodiment. The image data output unit 11 in FIG. 8 generates image data from print data received from a host computer (not shown) and sends the image data in a video signal to an LED driving circuit 12. The LED driving circuit 12 includes an image forming processor (not shown) that carries out image formation processing by converting the serial video signal to parallel form and outputting parallel image data to an LED array light source 14, thereby causing the LEDs to emit light.

The LED array light source 14 comprises a plurality of LED array chips (or modules) 15 each including, typically, sixty-four to one hundred twenty-eight LEDs with nominally identical operating characteristics, and a plurality of drivers (not shown) that selectively drive the LEDs. The LED array chips are arranged so that the LEDs form a linear array.

The light emitted from the LEDs is focused by a rod lens array 16 onto the rotating surface of a photosensitive drum 19, to which a uniform electrostatic charge has been applied by a charging unit 18. The LED array light source 14 and rod lens array 16 constitute an LED head 21. Charge escapes from the illuminated parts of the surface of the photosensitive drum 19, forming a latent electrostatic image that is developed by the application of toner particles from a developing unit 20 as the photosensitive drum 19 rotates. As a result, a black-and-white toner image is formed on the surface of the photosensitive drum 19.

As the photosensitive drum 19 continues to rotate, a transfer unit 22 transfers the toner image from the surface of the photosensitive drum 19 to paper 23. The paper 23 is then transported to a fusing unit (not shown) that fuses the toner image onto the paper 23.

Next, the LED driving circuit 12 will be described in more detail.

Figure 9:
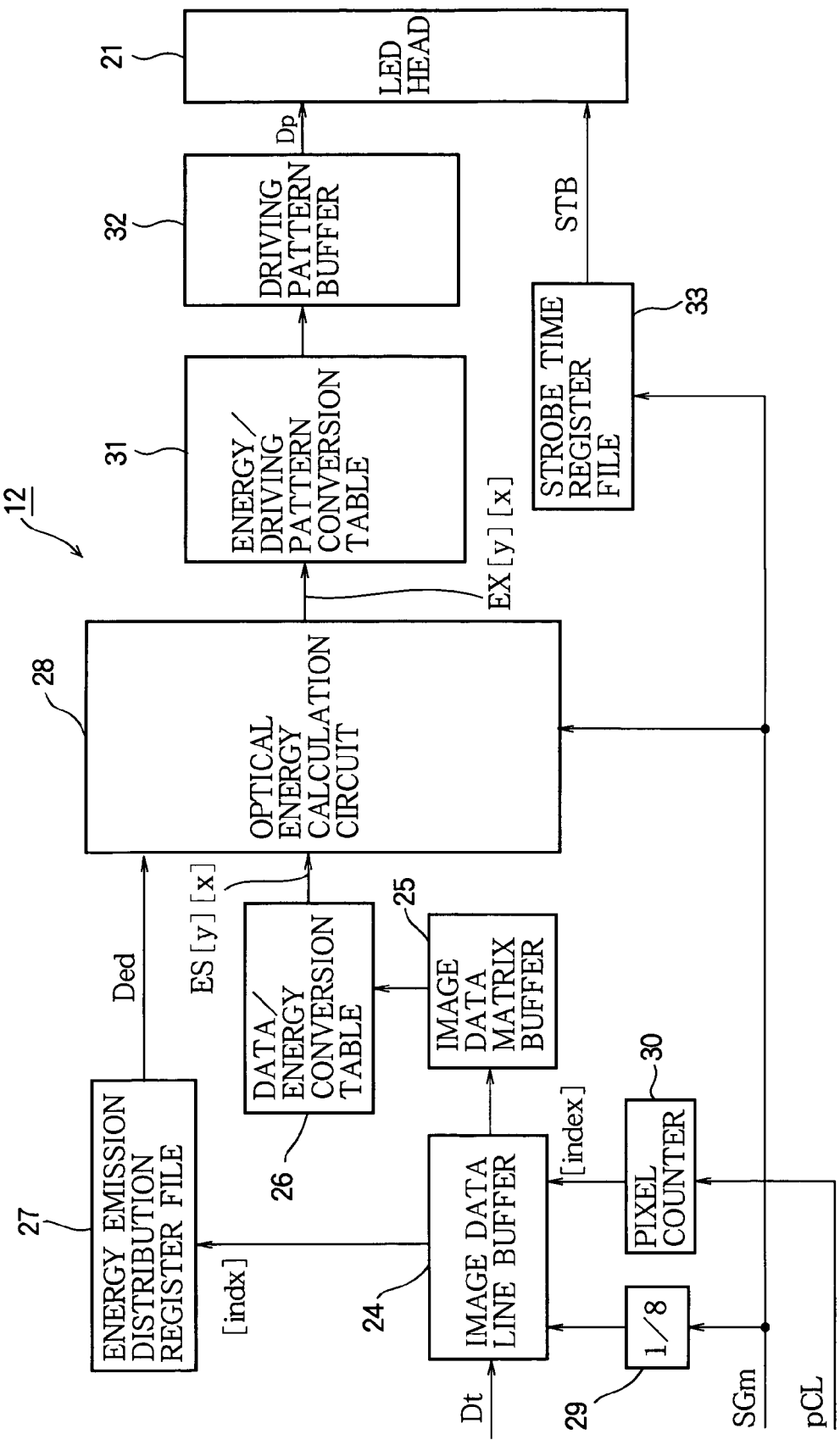
FIG. 9 is a block diagram of an LED driving circuit in a first embodiment of the invention.

Referring to FIG. 9, the LED driving circuit 12 includes an image data line buffer 24, an image data matrix buffer 25, an image-data-to-energy conversion table 26, an energy emission distribution register file 27, an optical energy calculation unit 28, a timing generator 29, a pixel counter 30, an optical-energy-to-LED-driving-pattern conversion table 31, a driving pattern buffer 32, and a strobe time register file 33. For brevity, the image-data-to-energy conversion table 26 will also be referred to as the data/energy conversion table, and the optical-energy-to-LED-driving-pattern conversion table 31 as the energy/driving pattern conversion table.

The timing generator 29 receives a microline synchronization signal SGm from the image data output unit 11 and generates a timing signal with ⅛ the period of the microline synchronization signal SGm. If the resolution of the image forming apparatus is six hundred lines per inch, for example, so that the lines are spaced at equal intervals of 1/600 inch, as will be assumed below, then the microline synchronization signal SGm and timing signal are related to the rotation of the photosensitive drum 19 so that the surface of the photosensitive drum 19 moves 1/600 inch per period of the timing signal and 1/4800 inch per period of the microline synchronization signal SGm, which thus corresponds to microlines spaced at equal intervals of 1/4800 inch.

The pixel counter 30 counts pulses of a pixel clock signal pCL received from the image data output unit 11, thereby generating an LED index signal (indx).

The image data line buffer 24 receives image data Dt indicating the gray level of each pixel in the image to be printed, and stores the data as line data Dti (i=1, 2, . . . ), operating in synchronization with the timing signal from the timing generator 29 and receiving the index signal (indx) from the pixel counter 30 as address information. The index signal (indx) indicates which LED principally illuminates the pixel described by the image data Dt.

The image data matrix buffer 25 receives pixel data from the image data line buffer 24 and stores a matrix of pixel data pix(y)(x), where the y coordinate indicates position in the paper transport direction and the x coordinate indicates position in the orthogonal direction. These coordinates are localized to the matrix: in the following description the matrix is a 9×9 matrix with x and y coordinates ranging from zero to eight.

The energy emission distribution register file 27 receives the LED index signal (indx) from the image data line buffer 24 and outputs energy emission distribution data Ded pertaining to the LED identified by the index signal. A separate energy emission distribution is stored in the energy emission distribution register file 27 for each LED. FIG. 10 shows an example of the energy emission distribution data Ded. The data are two-dimensional, taking the form of a 9×9 matrix W(indx)(y)(x) indicating the emission distribution characteristics of an individual LED, and are obtained from measurements of optical output power made during the fabrication of the LED head 21. The data are indicated in FIG. 10 in exponential notation: for example, 2.19E-05 indicates $2.19 \times 10^{-5}$.

The 9×9 matrix in FIG. 10 corresponds to a 9×9 grid with grid lines spaced at intervals equal to the basic dot resolution (1/600 inch). The data indicate the optical energy delivered to the dot cells in a 9×9-dot illumination space when an LED is driven to form a dot in the central cell, which has coordinates (4)(4). The highest value is normally W(indx)(4)(4), and the values normally decrease as the distance from the central cell increases. The size of the matrix is selected so that the values at the corners, e.g., W(indx)(9)(9) are, in this case, four orders of magnitude less than the value in the central cell.

Although the data shown in FIG. 10 are distributed symmetrically about the central cell, this need not be true in general. Two cells in the matrix may have different data values W(indx)(y)(x) even though they are equally distant from the central cell; an example will be shown in FIG. 48. The sum of the data values in the matrix may also differ from one LED to another.

The data/energy conversion table 26 is used to convert the pixel data pix(y)(x), which represent gray levels, to equivalent optical energy values ES(y)(x). These values are calculated on the assumption that a sufficiently large area is illuminated by uniform LEDs having a typical energy emission distribution Ded. The data/energy conversion table 26 thus converts gray levels to intended optical energy levels. When the data/energy conversion table 26 receives pixel data pix(y)(x) from the image data matrix buffer 25, it outputs the equivalent optical energy ES(y)(x). FIG. 11 shows an example of the data that may be stored in the data/energy conversion table 26 to convert gray levels from zero to thirty-one to optical energy levels given in picojoules (pJ).

The optical energy calculation unit 28 uses the energy emission distribution data Ded output from the energy emission distribution register file 27 to calculate the amount of energy that must be produced by each LED to achieve the intended optical energy levels output from the image-data-toenergy conversion table 26. When a pixel of interest on the surface of the photosensitive drum 19 is illuminated by an LED to form a dot, some of the optical energy emitted by the LED fails to be focused onto the pixel of interest, the amount of optical energy lost from the pixel of interest in this way depending on the energy emission distribution of the LED. Moreover, other nearby pixels (surrounding pixels) may also be illuminated by the same or other LEDs to form other dots, and some of the optical energy intended for these other pixels may illuminate the pixel of interest instead, depending on the energy emission distributions of the LEDs. Thus if the LEDs are driven according to the optical energy values $ES(y)(x)$ output from the data/energy conversion table 26, the pixels will in general receive amounts of optical energy that differ from the intended amounts $ES(y)(x)$.

The optical energy calculation unit 28 uses the distribution data Ded to calculate these differences and adjust the optical energy values $ES(y)(x)$ to obtain different values $EX(y)(x)$ such that if the LEDs are driven according to these different optical energy values $EX(y)(x)$, the pixels will receive the intended amounts of optical energy $ES(y)(x)$.

Figure 12:
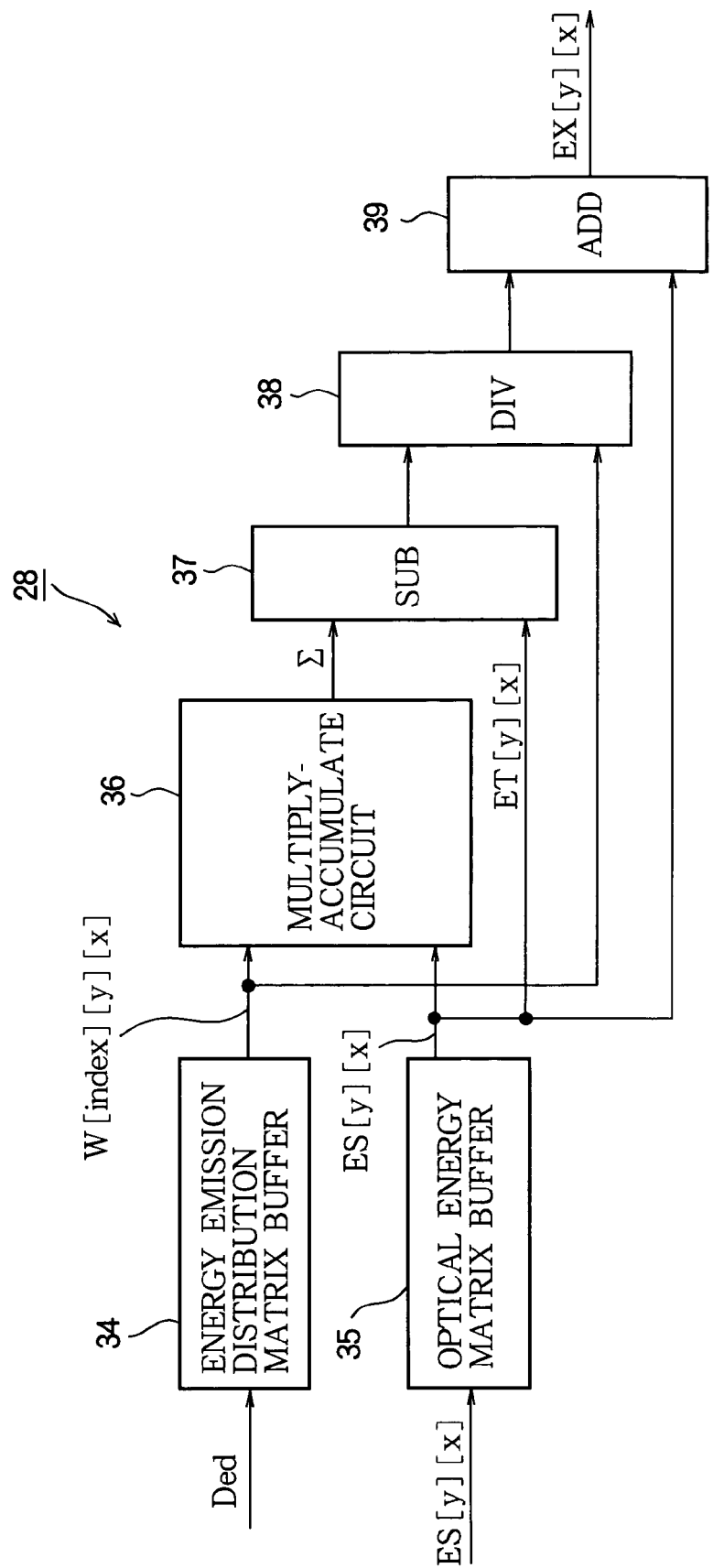
FIG. 12 is a block diagram of the optical energy calculation circuit in the first embodiment.

Referring to FIG. 12, the optical energy calculation unit 28 comprises an energy emission distribution matrix buffer 34, an optical energy matrix buffer 35, a multiply-accumulate circuit 36, a subtraction circuit (SUB) 37, a division circuit (DIV) 38, and an addition circuit (ADD) 39.

The energy emission distribution matrix buffer 34 stores energy emission distribution data Ded read from the energy emission distribution register file 27.

The optical energy matrix buffer 35 stores the optical energy values $ES(y)(x)$ received from the data/energy conversion table 26, provides the stored values $ES(y)(x)$ to the multiply-accumulate circuit 36, and provides the same values to the subtraction circuit 37. The values provided to the subtraction circuit 37 will be denoted $ET(y)(x)$. Although $ES(y)(x)$ and $ET(y)(x)$ have the same value, $ES(y)(x)$ represents the optical energy emitted by an LED and $ET(y)(x)$ represents the optical energy received on the surface of the photosensitive drum 19.

The multiply-accumulate circuit 36 multiplies the distribution values $W(indx)(y)(x)$ received from the energy emission distribution matrix buffer 34 by the intended energy levels of the corresponding pixels, received from the optical energy matrix buffer 35, and accumulates the products. The result of this multiply-accumulate operation indicates the optical energy that would be received by the pixel of interest if the nine LEDs illuminating this pixel and the surrounding pixels in a 9×9 area were to be driven according to the intended energy levels $ES(y)(x)$ of the pixels. The multiply-add operation can be described by the following equation. The resulting sum will be denoted $\Sigma$.

$$\Sigma = \sum_{y=0}^{8}\sum_{x=0}^{8}(W(x+indx-4)(8-y)(8-x)\times ES(y)(x))$$

The subtraction circuit 37 subtracts the sum $\Sigma$ obtained by the multiply-accumulate circuit 36 from the intended energy level $ET(y)(x)$ of the pixel of interest to find the amount by which the intended level needs to be adjusted. The result $(ET(y)(x)-\Sigma)$ is divided by the energy emission distribution value $W(indx)(y)(x)$ in the division circuit 38, and then added to the intended energy level $ET(y)(x)$ in the addition circuit 39 to obtain the adjusted intended energy level $EX(y)(x)$, which is given by the following equation:

$$EX(y)(x)=ES(y)(x)+(ET(y)(x)-\Sigma)/W(indx)(y)(x)$$

Referring again to FIG. 9, the energy/driving pattern conversion table 31 stores data for converting the adjusted optical energy level $EX(y)(x)$ to an LED driving pattern, indicating the microlines in which the LED is to be driven. FIG. 13 shows an example of the data stored in the energy/driving pattern conversion table 31. The driving patterns are described in bit-mapped fashion by hexadecimal numbers from 00 to ff; the corresponding optical energies are indicated in picojoules. When the energy/driving pattern conversion table 31 receives an adjusted optical energy level $EX(y)(x)$ from the optical energy calculation unit 28, it outputs the index number of the most closely matching driving pattern to the driving pattern buffer 32.

The driving pattern buffer 32 stores the driving pattern data received from the energy/driving pattern conversion table 31. The eight bits of a given pattern indicate the microlines in which the LED is to be driven. As shown in FIG. 14, the driving times are reduced by half in each successive microline. If an LED is turned on for the indicated times in all eight microlines, the total illumination time is 19.9 μs, which corresponds to the maximum possible adjusted optical energy $EX(y)(x)$. The pattern data Dp stored in the driving pattern buffer 32 are supplied to the LED head 21.

The strobe time register file 33 includes eight registers with the timing data shown in FIG. 14. The strobe time register file 33 selects these registers in a cyclic pattern in synchronization with the microline synchronization signal SGm. Upon selecting a register, the strobe time register file 33 activates a strobe signal STB for the duration of time indicated in the register. The strobe signal STB is supplied to the LED head 21.

In the LED head 21, LEDs are driven according to the pattern data Dp for the durations of time indicated by the strobe signal STB.

Next, the process by which the optimum value of the optical energy $EX(4)(4)$ for an LED is calculated will be described with reference to FIGS. 15, 16, and 17. FIG. 15 indicates the state of the image data line buffer 24 in FIG. 9. The LED of interest is the first LED in the array, with index number zero. FIG. 16 indicates the contents of the optical energy matrix buffer 35 in FIG. 12. FIG. 17 indicates the contents of the energy emission distribution matrix buffer 34. The numbers at the top of FIG. 15 are LED index numbers (indx). The negative index numbers correspond to non-existent LEDs that are assumed to be part of the LED array for computational purposes.

The image data output from the image data output unit 11 in FIG. 8 are received and stored sequentially in the image data line buffer 24 in FIG. 9. FIG. 15 shows the state in which the first five lines of image data on a page (Dt1-Dt5) have been received. The image data are indicated by asterisks. The zeros above the asterisks correspond to four non-existent lines that are assigned zero image data for computational purposes. The zeros below the asterisks correspond to lines of image data that have not been received yet.

To calculate the optimum energy when LED No. 0 is driven to form the first pixel in the first line, the 9×9 matrix of pixel values $pix(y)(x)$ indicated by the thick lines in FIG. 15 is transferred to the image data matrix buffer 25. The image data matrix buffer 25 accordingly stores zero data for the first four (non-existent) lines and the first four (non-existent) LEDs, and stores received image data for the other cells in the matrix.

The last LED for which data are included in the matrix is LED No. 4, so in this embodiment, the index number sent from the image data line buffer 24 to the energy emission distribution register file 27 is four (indx=4). The energy emission distribution register file 27 then sends the necessary energy emission distribution data Ded for nine LEDs with index numbers up to four to the optical energy calculation unit 28. The energy emission distribution data for the (non-existent) LEDs with negative index numbers are all zero.

The data in the matrix in FIG. 15 are converted to energy data by the image-data-to-energy conversion table 26 and supplied to the optical energy calculation unit 28, which computes the optimum optical energy value EX(4)(4) of LED No. 0 by adjusting the intended value ES(4)(4) as described above.

$$EX(4)(4)=ES(4)(4)+(ET(4)(4)-\Sigma)/W(0)(4)(4)$$

The quantity $\Sigma$ is calculated as follows.

$$\sum = \sum_{y=0}^{8} \sum_{x=0}^{8} (W(x-4)(8-y)(8-x) \times ES(y)(x))$$

The value of $\Sigma$ includes the sum of the optical energy contributed by peripheral LEDs when the LED of interest is driven according to image data pix(4)(4).

Referring to FIG. 16, during this calculation, the optical energy matrix buffer 35 stores the image data pix(y)(x) for the peripheral pixels as well as the data pix(4)(4). The solid arrow, dotted arrow, and dot-dash arrow indicate that part of the optical energy intended for pix(0)(0), pix(4)(0), and pix(8)(0) is contributed to the central pixel in the matrix instead. These unintended contributions are proportional to the energy emission distribution data W(−4)(8)(8), W(−4)(4)(8), and W(−4)(0)(8), as indicated by the cells in FIG. 17 outlined in corresponding thick solid lines, dotted lines, and dash-dot lines.

The value (ET(y)(x)−$\Sigma$) can be expressed in a different form as −($\Sigma$−ET(y)(x)), indicating that the intended energy level of the pixel of interest has been subtracted from the sum of the contributions of all the pixels in the matrix, leaving the amount by which the total contribution differs from the intended value. Thus the optical energy delivered to the pixel of interest, which is a cell 1/600 inch on a side, needs to be adjusted by this amount. When the image data value of the pixel of interest is adjusted, the effect on the pixel of interest is given by multiplying the corresponding adjustment of the optical energy value ES(4)(4) by the corresponding distribution value, which in this case is W(0)(4)(4), so the correct adjustment is calculated by dividing the above difference by W(0)(4)(4). The quotient is added to ES(4)(4) to obtain the optimum optical energy EX(4)(4) for LED No. 0 when this LED is driven to form the first pixel in the first line.

The optical energy EX(4)(4) is converted to an LED driving pattern by the optical-energy-to-LED-driving-pattern conversion table 31, and the pattern data are stored in the driving pattern buffer 32.

This process is repeated for the subsequent image data pix(y)(x) in the first line of pixels, the index value (indx) increasing at each subsequent pixel. When the end of the line is reached, the driving pattern data corresponding to eight complete microlines have been stored in the driving pattern buffer 32. These data are then sent to the LED head 21 in synchronization with the microline synchronization signal SGm, one microline at a time. Subsequent lines of pixels are processed in the same way, and the driving patterns continue to be sent to the LED head 21 in synchronization with the microline synchronization signal SGm until the end of the page is reached.

In the strobe time register file 33, the register storing the strobe duration for each-microline is selected, and a strobe signal STB is output to the LED head 21 for the duration given in the selected register.

In this embodiment, since the optical energy EX(y)(x) is adjusted according to the energy emission distribution data Ded, irregularities in the amount of toner applied to the latent electrostatic image can be avoided, and printing quality can be improved. Image quality can be improved even if the image includes isolated black dots, thin lines, white dots, white lines, and other components with high spatial frequencies.

Figure 19:
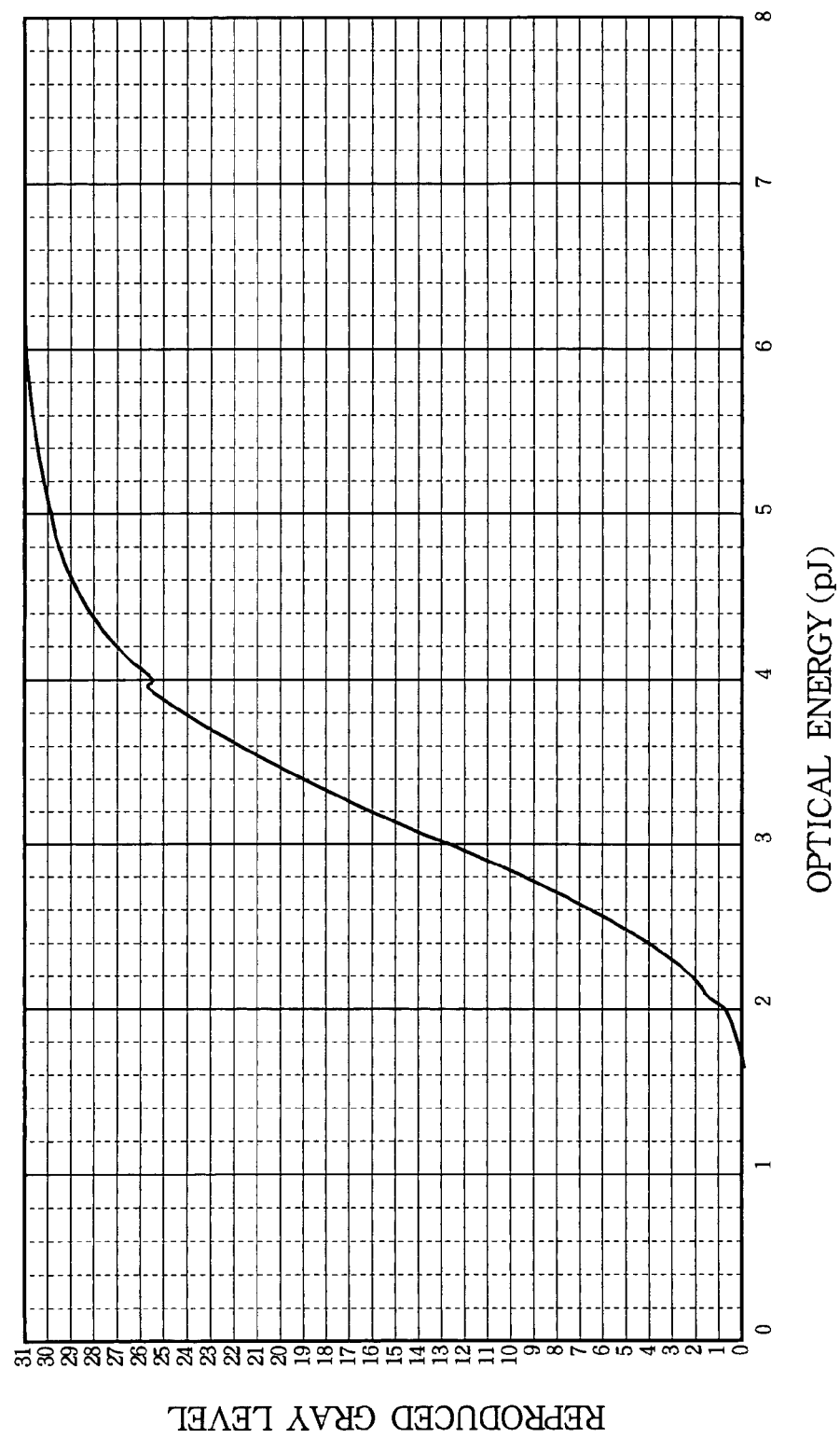
FIG. 19 is a graph showing a result of simulation of the reproduction of a gray scale in the second embodiment.

Next, a second embodiment will be described with reference to FIGS. 18 and 20, which show examples of optical energy distributions, and FIG. 19, which shows a result of simulation of the reproduction of a gray scale. In FIG. 19, the horizontal axis indicates optical energy EX(y)(x) in picojoules (pJ), and the vertical axis indicates reproduced gray levels.

In the second embodiment, the energy emission distribution data Ded of an LED are stored in the energy emission distribution register file 27 in FIG. 9 in the form of a 7×7 matrix of data W(indx)(y)(x). The 7×7 matrix is obtained by eliminating the outermost columns and rows of the 9×9 matrix of the first embodiment, i.e., W(indx)(y)(0), W(indx)(y)(8), W(indx)(0)(x), and W(indx)(8)(x), which contain 32 cells in total and are referred to below as outermost distribution data. Elimination of these data enables the size of both the energy emission distribution register file 27 and the optical energy calculation unit 28 to be reduced.

A gray scale with 32 gray levels is specified for the LED printer in the second embodiment. The minimum numbers of rows and columns in a matrix necessary to satisfy this specification is determined by a method described below (both numbers are seven in this embodiment) and the sizes of the energy emission distribution register file 27 and optical energy calculation unit 28 are then determined on the basis of this matrix size.

FIG. 19 shows the reproduced gray levels obtained when a sufficiently large area is illuminated by using a LED head 21 comprising only LEDs having a typical energy emission distribution Ded and emitting the same optical energy EX(y)(x). As shown in FIG. 19, the dependency of the reproduced gray levels on the optical energy EX(y)(x) shows the steepest energy sensitivity around 3.0 pJ, the value reaching about 0.1 pJ per gray level.

The outermost distribution data shown by the shaded cells in FIG. 20, which were used in the first embodiment, are not used in the second embodiment. The total sum $\Sigma$out of the unused data in the energy emission distribution Ded outside the 7×7 matrix is about 0.0144. This outermost component $\Sigma$out indicates the effect of the energy emission distribution Ded on the pixel of interest that is lost by not using the outermost distribution data.

If the maximum optical energy EXmax is defined as the optical energy EX(y)(x) of an LED at which the reproduction of a gray scale shows the steepest energy sensitivity characteristics and all LEDs in the LED head 21 emit light at EXmax, and if the total value of the energy emission distribution Ded of the LED of interest is denoted $\Sigma$tot, then the peripheral optical energy error $\Delta\Sigma$ caused by not using the outermost distribution data is given by the following equation:

$$\Delta\Sigma = EX\max \times (\Sigma out/\Sigma tot)$$

where Σtot has a value of about 1.0. Since EXmax and Σout have values of about 3.0 and 0.0144, respectively, as noted above, the error ΔΣ is calculated as follows:

$$\Delta\Sigma = 3.0 \text{ pJ} \times 0.0144 \approx 0.043 \text{ pJ}$$

Since the resulting error ΔΣ of 0.043 pJ is less than the 0.1 pJ per gray level, the reproduced gray scale error caused by not using the outermost distribution data is less than one gray level, so the effect on image quality is minimal.

The matrix size can always be determined from the LED printer specification as described above so that the reproduced gray scale error does not exceed one gray level.

Since LED emission is controlled by the strobe signal STB, the control is limited by the minimum unit of time stored in the strobe time register file 33. If the matrix size is selected as described above, the maximum effect of the error ΔΣ is equivalent to this minimum unit of time. That is, the maximum image irregularity arises when the optical energy EX(y)(x) is incorrect by an amount equivalent to the minimum unit of strobe time.

Next, the process by which the optimum value of the optical energy EX(3)(3) for an LED is calculated from the pixel data pix(3)(3) will be described with reference to FIGS. 21, 22, and 23. FIG. 21 is similar to FIG. 15, indicating the state of the image data line buffer 24 in FIG. 9. The LED of interest is the first LED in the array, with index number zero. FIG. 22 indicates the state of the optical energy matrix buffer 35 in FIG. 12. FIG. 23 indicates the state of the energy emission distribution matrix buffer 34 in FIG. 12.

The image data output from the image data output unit 11 in FIG. 8 are received and stored sequentially in the image data line buffer 24. FIG. 21 shows the state in which data, indicated by asterisks, for the first four lines of image data on a page (Dt1-Dt4) have been received. The image data are indicated by asterisks. The zeros above and to the left of the asterisks correspond to non-existent lines and pixels, for which zero data are assumed for computational purposes.

To calculate the optimum energy when LED No. 0 is driven to form the first pixel in the first line, the 7×7 matrix of pixel values pix(y)(x) indicated by the thick lines in FIG. 21 is transferred to the image data matrix buffer 25, and the index number three (indx=3) is sent from the image data line buffer 24 to the energy emission distribution register file 27. The necessary energy emission distribution data Ded for seven LEDs with index numbers up to three are then sent from the energy emission distribution register file 27 to the optical energy calculation unit 28. The energy emission distribution data for the (non-existent) LEDs with negative index numbers are all zero.

The data in the matrix in FIG. 21 are converted to energy data by the image-data-to-energy conversion table 26 and supplied to the optical energy calculation unit 28, which computes the optimum optical energy value EX(3)(3) of LED No. 0 by adjusting the intended value ES(3)(3) as explained in the first embodiment.

$$EX(3)(3) = ES(3)(3) + (ET(3)(3) - \Sigma)/W(0)(3)(3)$$

The quantity Σ is calculated as follows.

$$\Sigma = \sum_{y=0}^{6} \sum_{x=0}^{6} (W(x-3)(6-y)(6-x) \times ES(y)(x))$$

The value of Σ includes the sum of the optical energy contributed by peripheral LEDs when the LED of interest is driven according to image data pix(3)(3).

Referring to FIG. 22, during this calculation, the optical energy matrix buffer 35 stores the image data pix(y)(x) for the peripheral pixels as well as the data pix(3)(3). The solid arrow, dotted arrow, and dot-dash arrow indicate that part of the optical energy corresponding to pix(0)(0), pix(3)(0), and pix(6)(0) is contributed to the central pixel in the matrix. These unintended contributions are proportional to the energy emission distribution data W(−3)(6)(6), W(−3)(3)(6), and W(−3)(0)(6), as indicated by the cells in FIG. 23 outlined in corresponding thick solid lines, dotted lines, and dash-dot lines.

As described above, according the second embodiment, outermost distribution data are eliminated without degrading the image quality, and the necessary capacity of the energy emission distribution register file 27 is thereby reduced to about 60% of the capacity of the energy emission distribution register file 27 in the first embodiment. This also leads to a substantial reduction in the size of the optical energy calculation unit 28.

Next, a third embodiment will be described with reference to FIG. 24, which shows a block diagram of the LED driver circuit.

The energy emission distribution data Ded stored in the energy emission distribution register file 27 for an individual LED take the form of a 7×7 matrix of data W(indx)(y)(x) as shown in FIG. 18, and are obtained from measurements of optical output power made during the fabrication of the LED head 21. The 7×7 matrix in FIG. 18 corresponds to a 7×7 grid with grid lines spaced at intervals equal to the basic dot resolution (1/600 inch) and indicates the optical energy delivered to the dot cell at each illumination position (y)(x).

The data W(indx)(y)(x) are categorized and redefined into 1024 types. The number 1024 is based on the fact that variations in the shape of the energy emission distribution Ded are strongly related to variations in the optical properties of the lenses in the rod lens array 16, so if minor deviations are tolerated, the number of different energy emission distributions does not exceed the number of rod lenses (substantially 1000 lenses in this embodiment, about one-seventh the number of LEDs in the LED head 21). The numbers of rows and columns in the matrix are determined so as to satisfy the LED printer specifications as in the second embodiment (both are again seven).

In the third embodiment, the number of energy emission distributions Ded stored in the energy emission distribution register file 27 is reduced to a number less than the number of LEDs in the LED head 21. For example, separate energy emission distribution data Ded may be stored in the energy emission distribution register file 27 for each rod lens, instead of for each LED. Index data rd are assigned to the LEDs to identify the corresponding energy emission distribution data Ded, and the index data are stored in an energy emission distribution index data block 41. The energy emission distribution index data block 41 receives an LED number (indx) from the image data line buffer 24 and provides the index data rd corresponding to the LED number (indx) to the energy emission distribution register file 27.

Next, the process by which the optimum value of the optical energy EX(3)(3) for an LED is calculated from the pixel data pix(3)(3) will be described.

The image data output from the image data output unit 11 in FIG. 8 are received and stored sequentially in the image data line buffer 24. When the first four lines of data on a page (Dt1-Dt4) have been received as shown in FIG. 21, to calculate the optimum optical energy for LED No. 0 in the first line (Dt1), the image data line buffer 24 sends index number three (indx=3) to the energy emission distribution index data block

41. The energy emission distribution index data block 41 then sends the corresponding index data rd for seven LEDs with index numbers up to three to the energy emission distribution register file 27, which sends the necessary energy emission distribution data Ded for the seven LEDs to the optical energy calculation unit 28. The optical energy calculation unit 28 stores the energy emission distribution data in the energy emission distribution matrix buffer 34 in FIG. 12.

The data in the matrix in FIG. 21 are transferred to the image data matrix buffer 25, converted to energy data by the data/energy conversion table 26, and supplied to the optical energy calculation unit 28, which stores the energy data in the optical energy matrix buffer 35 in FIG. 12. The optical energy calculation unit 28 computes the optimum optical energy value EX(3)(3) of LED No. 0 by adjusting the intended value ES(3)(3) as described in the first and second embodiments.

$$EX(3)(3)=ES(3)(3)+(ET(3)(3)-\Sigma)/W(0)(3)(3)$$

The quantity Σ is calculated as follows.

$$\sum = \sum_{y=0}^{6} \sum_{x=0}^{6} (W(x-3)(6-y)(6-x) \times ES(y)(x))$$

The value of Σ includes the sum of the optical energy contributed by peripheral LEDs when the LED of interest is driven according to image data pix(3)(3).

As described above, according to the third embodiment, since it is not necessary to store separate energy emission distribution data Ded in the energy emission distribution register file 27 for each LED in the LED head 21, the size of the energy emission distribution register file 27 can be reduced. In an exemplary case of approximately seven LEDs per rod lens, the size of the energy emission distribution register file 27 can be reduced by about 86.7% as compared with the second embodiment, which also leads to a substantial reduction of the size of the optical energy calculation unit 28.

Next, a fourth embodiment will be described with reference to FIGS. 24 to 28. FIG. 24 shows a block diagram of the LED driver circuit; FIG. 25 shows an exemplary optical energy distribution; FIG. 26 shows exemplary image data; FIGS. 27 and 28 show examples of optical energy distribution data.

Figure 24:
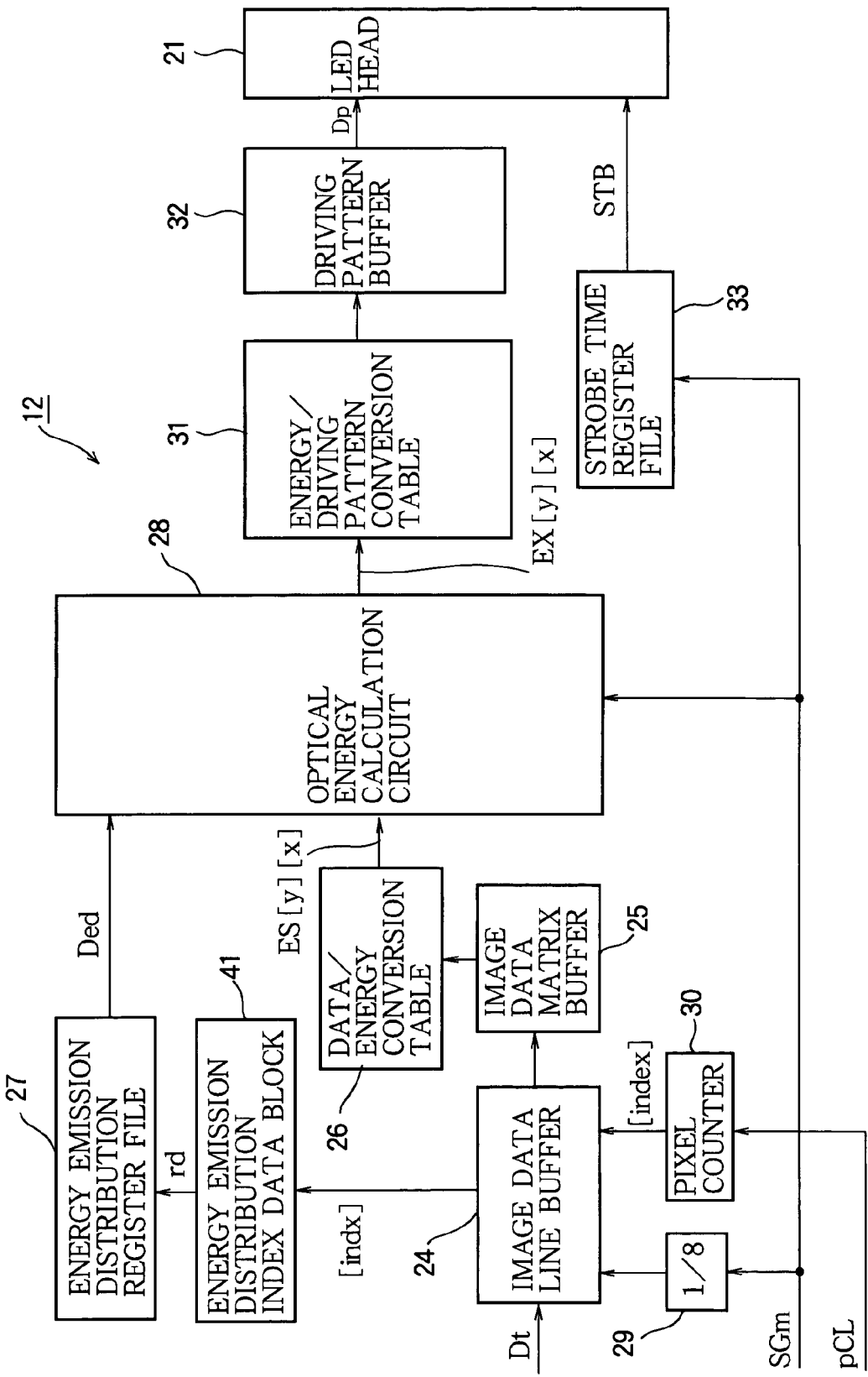
FIG. 24 is a block diagram of the LED driving circuit in third and fourth embodiments of the invention.

In the fourth embodiment, the LED energy emission distribution data Ded stored in the energy emission distribution register file 27 in FIG. 24 form a 5×5 matrix of data W(indx)(y)(x) as shown in FIG. 25. The outermost data W(indx)(y)(x) in the matrix, which are referred to below as outermost peripheral data, are adjusted so as to increase the data values.

As in the second embodiment, the LED printer specification requires thirty-two gray levels to reproduce the image data Dt, so the minimum numbers of rows and columns in a matrix necessary to meet the specification would normally both be seven. Both numbers can however be reduced to five by increasing the outermost peripheral data values.

FIG. 26 shows an example of a 7×7 block of cells extracted from the image data, in which the numbers in the cells indicate the gray levels of the image data pix(y)(x). It can be appreciated from FIG. 26 that the gray level difference between adjacent cells is generally smaller than the difference between relatively remote cells. This indicates that pixels that are close together tend to have nearly the same intensity value; this is particularly true in natural images.

Utilizing this characteristic, the outermost peripheral data in a 5×5 matrix are created by adding the outermost peripheral data in the 7×7 matrix shown in FIG. 18 to the data W(indx)(y)(x) of the next inner cells in the same matrix. The 5×5 matrix is then logically equivalent to a 7×7 matrix, and can be used in place of the 7×7 matrix on the assumption that adjacent cells have similar values.

The data W(indx)(y)(x) in the 7×7 matrix in FIG. 18 are denoted W1 in FIG. 27; the data in the 5×5 matrix in FIG. 25 are denoted W2 in FIG. 28. The outermost peripheral data W1 and W2 are related by the numbers in parentheses shown outside the frame. For example, the sum of the four W1 values in square (1) in FIG. 27 is equal to the single value W2 in square (1) in FIG. 28.

The W1 data are added at intervals equal to the basic dot resolution (1/600 inch) on the basis of optical output power measured during the fabrication of the LED head 21.

Next, the process by which the optimum value of the optical energy EX(2)(2) for an LED is calculated from the pixel data pix(2)(2) will be described with reference to FIGS. 29, 30, and 31. FIG. 29 is similar to FIG. 15 and FIG. 21, indicating the state of the image data line buffer 24 in FIG. 24. The LED of interest is the first LED in the array, with index number zero. FIG. 30 indicates the state of the optical energy matrix buffer 35 in FIG. 12. FIG. 31 indicates the state of the energy emission distribution matrix buffer 34 in FIG. 12.

The image data output from the image data output unit 11 in FIG. 8 are received and stored sequentially in the image data line buffer 24. FIG. 29 shows the state in which data for the first three lines of image data on a page (Dt1-Dt3) have been received. The image data are indicated by asterisks. The zeros above and to the left of the asterisks correspond to non-existent lines and pixels, for which zero data are assumed for computational purposes.

To calculate the optimum energy when LED No. 0 is driven to form the first pixel in the first line, the 5×5 matrix of pixel values pix(y)(x) indicated by the thick lines in FIG. 29 is transferred to the image data matrix buffer 25, and the index number two (indx=2) is sent from the image data line buffer 24 to the energy emission distribution register file 27. The energy emission distribution register file 27 then sends the necessary energy emission distribution data Ded for five LEDs with index numbers up to two to the optical energy calculation unit 28. The energy emission distribution data for the (non-existent) LEDs with negative index numbers are all zero.

The data in the matrix in FIG. 29 are converted to energy data by the data/energy conversion table 26 and supplied to the optical energy calculation unit 28, which computes the optimum optical energy value EX(2)(2) of LED No. 0 by adjusting the intended value ES(2)(2) as explained in the first embodiment.

$$EX(2)(2)=ES(2)(2)+(ET(2)(2)-\Sigma)/W(0)(2)(2)$$

The quantity Σ is calculated as follows.

$$\sum = \sum_{y=0}^{4} \sum_{x=0}^{4} (W(x-2)(4-y)(4-x) \times ES(y)(x))$$

The value of Σ includes the sum of the optical energy contributed by peripheral LEDs when the LED of interest is driven according to image data pix(2)(2).

Referring to FIG. 30, during this calculation, the optical energy matrix buffer 35 stores the image data pix(y)(x) for the peripheral pixels as well as the data pix(2)(2). The solid arrow, dotted arrow, and dot-dash arrow indicate that part of the optical energy corresponding to pix(0)(0), pix(2)(0), and pix(4)(0) is contributed to the central pixel in the matrix.

From FIG. 27, it can be seen that the contribution from pix(2)(0), for example, includes a further contribution from pix(2)(−1), which is assumed to have substantially the same value as pix(2)(0). Similarly, the contribution from pix(0)(0) is lumped together with contributions from pix(0)(−1), pix(−1)(−1), and pix(−1)(0), which are assumed to have substantially the same intended data value as pix(0)(0), and the contribution from pix(4)(0) is lumped together with contributions from pix(4)(−1), pix(5)(−1), and pix(5)(0), which are assumed to have substantially the same intended data value as pix(4)(0). These three lumped contributions are proportional to the energy emission distribution data W(−2)(4)(4), W(−2)(2)(4), and W(−2)(0)(4), as indicated by the cells in FIG. 31 outlined in corresponding thick solid lines, dotted lines, and dash-dot lines. Thus although the optical energy calculation circuit 28 operates on only a 5×5 matrix of data, it calculates peripheral optical energy from a 7×7 pixel area.

As described above, the matrix size is further reduced in the fourth embodiment, whereby the necessary capacity of the energy emission distribution register file 27 is reduced to about 51% of the capacity required in the second embodiment. This also leads to a substantial reduction in the size of the optical energy calculation unit 28.

When adjacent pixels do not have similar values, the peripheral optical energy calculated in the fourth embodiment may be somewhat in error, but since the outermost peripheral data values in the 7×7 matrix shown in FIG. 18 are small to begin with, the error is small and does not greatly affect the quality of the printed image.

Figure 32:
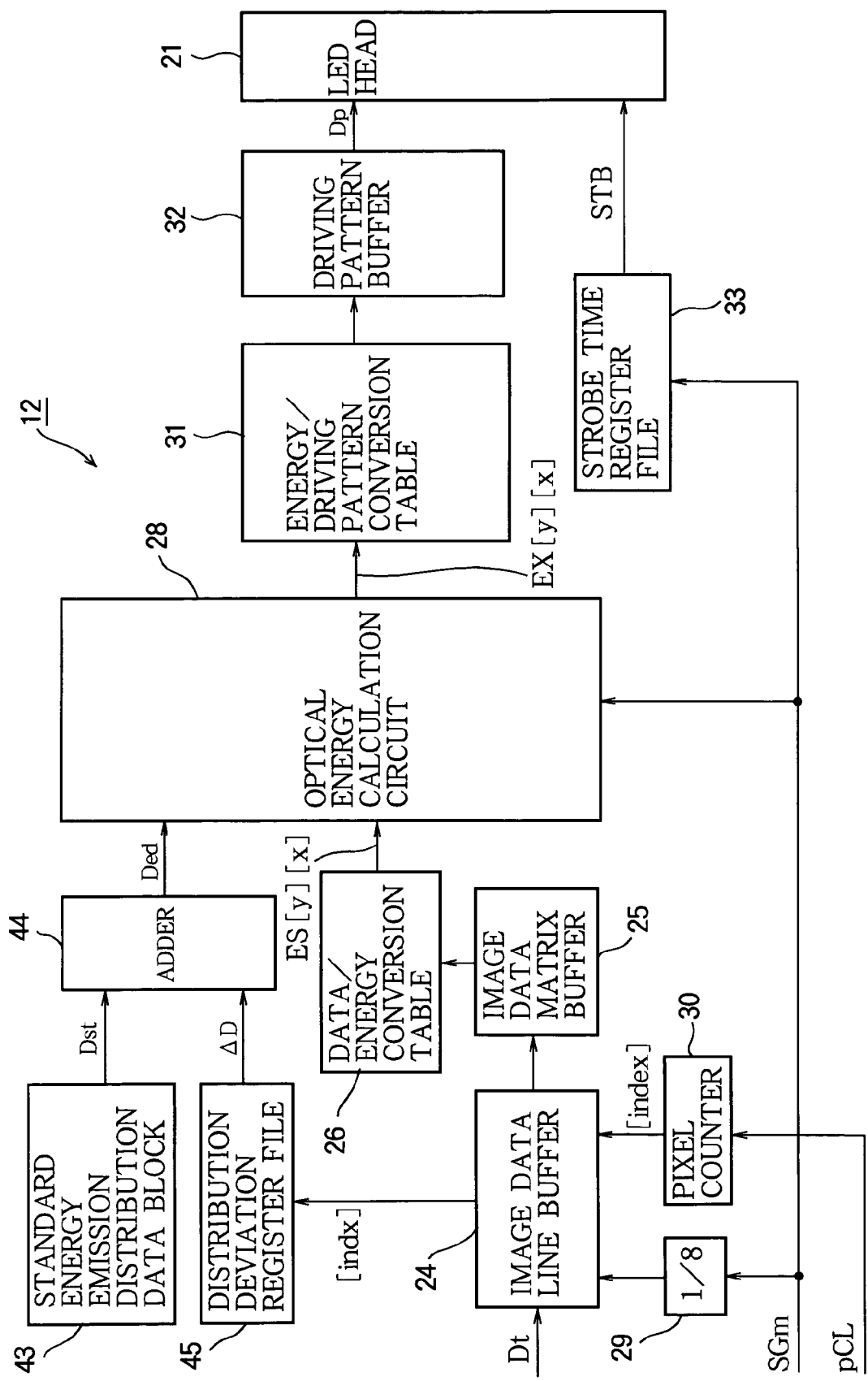
FIG. 32 is a block diagram of the LED driving circuit in a fifth embodiment of the invention.
Figure 34:
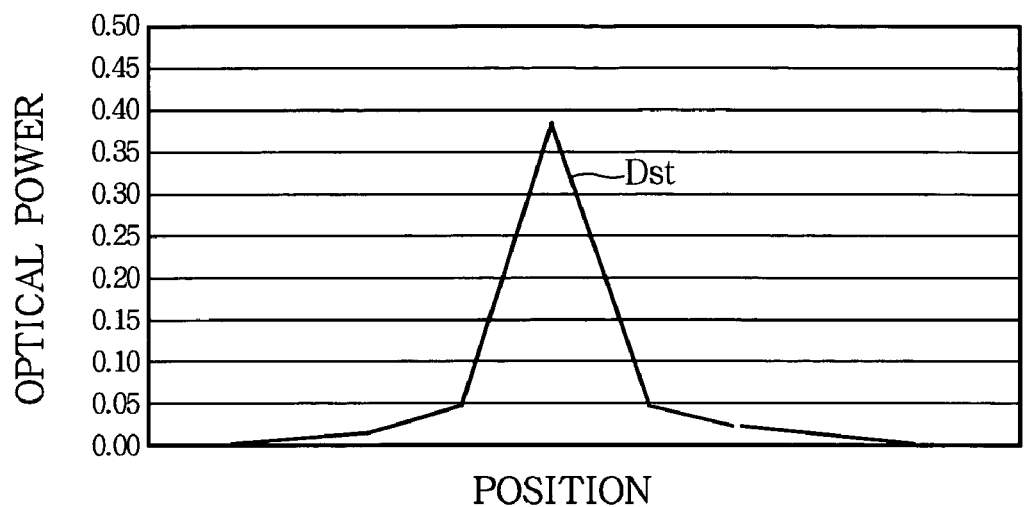
FIG. 34 shows a profile of a standard energy emission distribution in the fifth embodiment.
Figure 35:
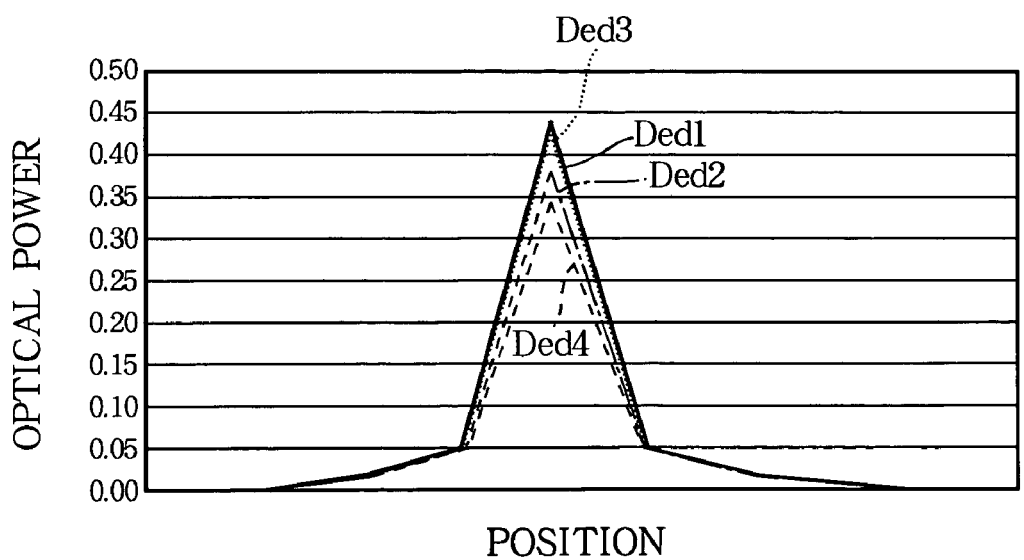
FIG. 35 shows profiles of representative energy emission distributions in the fifth embodiment.

Next, a fifth embodiment will be described with reference to FIGS. 32 to 35. FIG. 32 shows a block diagram of the LED driver circuit; FIG. 33 shows an example of a typical energy emission distribution; FIG. 34 shows the shape of a standard emission distribution; and FIG. 35 shows shapes of representative energy emission distributions. In FIGS. 34 and 35, the horizontal axis indicates position on the illuminated surface, and the vertical axis indicates optical power.

In the fifth embodiment, the LED driving circuit 12 includes a standard energy emission distribution data block 43 and a distribution deviation register file 45 as shown in FIG. 32. The standard energy emission distribution data block 43 is a memory area that stores the standard energy emission distribution Dst shown in FIG. 34, representing a standard distribution of optical energy emitted by an LED. The distribution deviation register file 45 stores energy emission distribution deviations ΔD representing deviations of the energy emission distributions Dedi (i=1, 2, . . . ) of the LEDs, shown in FIG. 35, from the standard energy emission distribution Dst; i.e., ΔD=Dedi−Dst. The standard energy emission distribution Dst and the deviations ΔD are both stored as 9×9 matrices.

If an actual energy emission distribution exceeds the standard energy emission distribution Dst, as is the case for distributions Ded1 and Ded3 in FIG. 35, its energy emission distribution deviation ΔD is a 9×9 matrix with positive values. If an energy emission distribution is smaller than the standard energy emission distribution Dst, as is the case for Ded2 and Ded4 in FIG. 35, its energy emission distribution deviation ΔD is a 9×9 matrix with negative values. Among the exemplary energy emission distributions in FIG. 35, Ded3 and Ded4 show the maximum deviations in the positive and negative directions, respectively.

The standard energy emission distribution data Dst form a 9×9 matrix of data Wst(indx)(y)(x) obtained by averaging the energy emission distribution data Ded W(indx)(y)(x) of the LEDs. The averaging is performed over all illumination positions (y)(x).

The energy emission distribution deviation data ΔD for an LED are obtained at the corresponding illumination positions (y)(x), and form a 9×9 matrix of data ΔW(indx)(y)(x) as shown in FIG. 33.

It can be appreciated from FIG. 35 that the range of variation between the maximum and minimum energy emission distributions, Ded3, Ded4, falls well within about one fourth the standard energy emission distribution data Wst(indx)(y)(x). Accordingly, in this embodiment, if thirteen-bit registers are used in the standard energy emission distribution data block 43 to store a matrix of data Wst(indx)(y)(x), then eleven-bit registers suffice in the distribution deviation register file 45 to store a matrix of deviation data ΔW(indx)(y)(x).

The distribution deviation register file 45 receives an LED No. (indx) sent from the image data line buffer 24, and outputs the energy emission distribution deviation data ΔD of the LED identified by the LED No. (indx) to an adder 44. The adder 44 adds the energy emission distribution deviation data ΔD received from the distribution deviation register file 45 to the standard energy emission distribution data Dst read from the standard energy emission distribution data block 43, thereby obtaining the energy emission distribution data Dep and outputting these data to the optical energy calculation unit 28.

As described above, according to the fifth embodiment, a standard energy emission distribution Dst and energy emission distribution deviations ΔD are stored in the standard energy emission distribution data block 43 and the distribution deviation register file 45, respectively, and the energy emission distributions Ded are obtained by adding them. The combined sizes of the standard energy emission distribution data block 43 and distribution deviation register file 45 can be reduced to about 85% of the size of the energy emission distribution register file 27 in the first embodiment, which also leads to a substantial reduction in the size of the optical energy calculation unit 28.

Next, a sixth embodiment will be described with reference to FIG. 36, which shows a block diagram of the LED driver circuit, and FIG. 37, which shows a block diagram of the optical energy calculation circuit.

Figure 36:
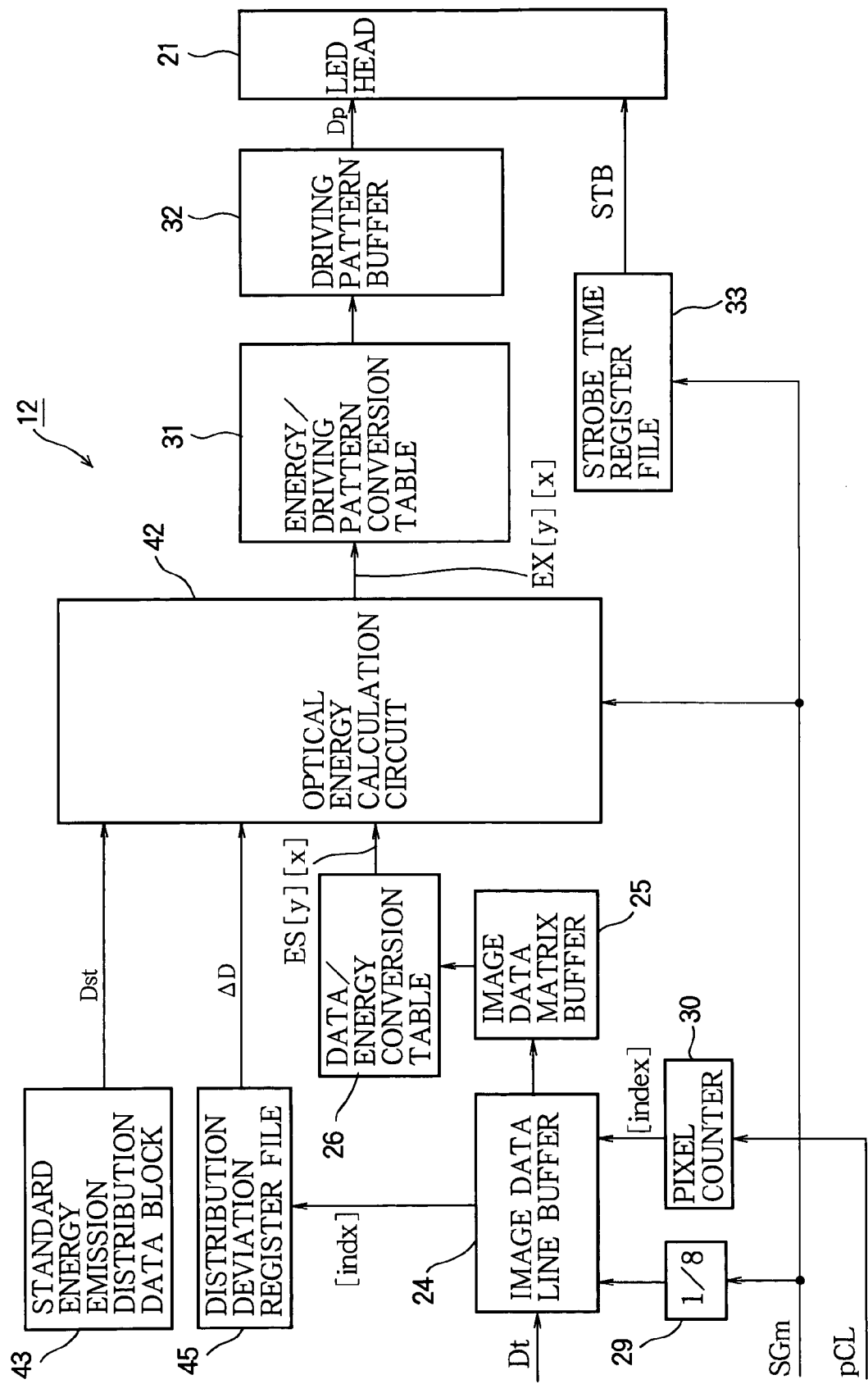
FIG. 36 is a block diagram of the LED driving circuit in a sixth embodiment of the invention.

As shown in FIG. 36, the LED driving circuit 12 in the sixth embodiment includes a standard energy emission distribution data block 43 and an distribution deviation register file 45. As in the fifth embodiment, the standard energy emission distribution data block 43 stores a standard energy emission distribution Dst such as the one shown in FIG. 34, and the distribution deviation register file 45 stores energy emission distribution deviations ΔD representing deviations of the energy emission distributions Dedi (i=1, 2, . . . ) of the LEDs from the standard energy emission distribution Dst, as shown in FIG. 35; i.e., ΔD=Dedi−Dst. The energy emission distribution deviation ΔD has a positive value if the energy emission distribution is larger than the standard energy emission distribution Dst and a negative value if the energy emission distribution is smaller than the standard energy emission distribution Dst.

Figure 37:
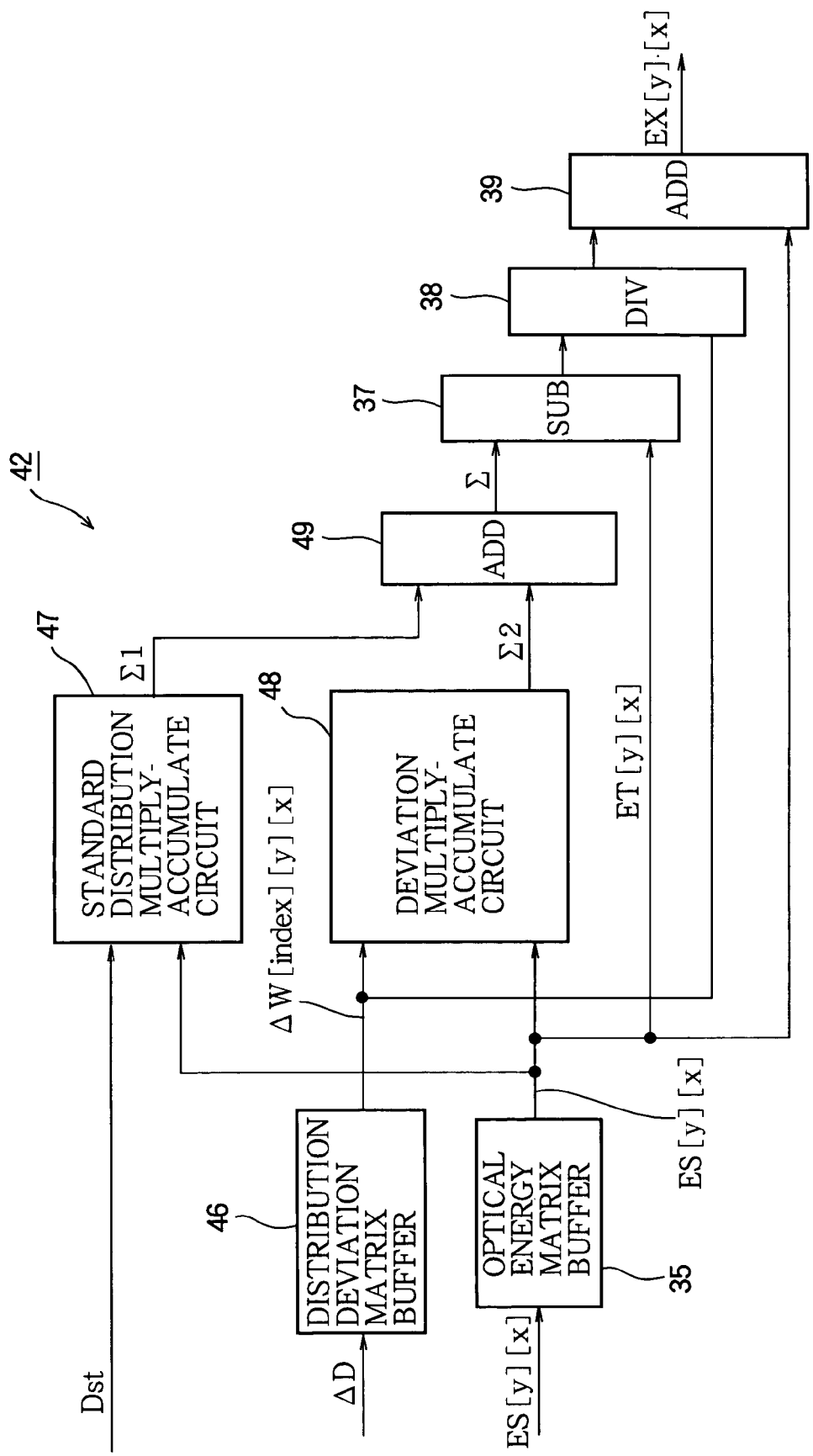
FIG. 37 is a block diagram of the optical energy calculation circuit in the sixth embodiment.

As shown in FIG. 37, the optical energy calculation circuit 42 comprises an optical energy matrix buffer 35, a subtraction circuit 37, a division circuit 38, an addition circuit 39, a distribution deviation matrix buffer 46, a standard distribution multiply-accumulate circuit 47, a deviation multiply-accumulate circuit 48, and another addition circuit 49.

The distribution deviation matrix buffer 46 stores optical emission distribution deviation data ΔD read from the distribution deviation register file 45, and outputs the deviation data ΔW(indx)(y)(x). The optical energy matrix buffer 35 stores optical energy data ES(y)(x) received from the data/energy conversion table 26, and outputs the optical energy data ES(y)(x) and ET(y)(x).

The standard distribution multiply-accumulate circuit 47 performs a first operation for calculating peripheral optical energy, more specifically a multiplication-accumulation operation on the standard energy emission distribution data Wst(indx)(y)(x) received from the standard energy emission distribution data block 43 and the optical energy data ES(y)(x) received from the optical energy matrix buffer 35, and outputs a first sum Σ1, which is the standard peripheral emission energy that the pixel of interest should receive from peripheral pixels. The first sum Σ1 indicates the effect of the peripheral pixels caused by the standard energy emission distribution Dst on the pixel of interest, and includes the effect of the pixel of interest itself.

The deviation multiply-accumulate circuit 48 performs a second operation for calculating peripheral optical energy, in which a multiplication-accumulation operation is performed on the energy emission distribution deviation data ΔW(indx)(y)(x) received from the distribution deviation matrix buffer 46 and the optical energy data ES(y)(x) received from the optical energy matrix buffer 35, and outputs a second sum Σ2, which is the deviation peripheral emission energy that the pixel of interest receives from peripheral pixels. The second sum Σ2 indicates the effect of the peripheral pixels caused by the energy emission distribution deviation ΔD on the pixel of interest, and includes the effect of the pixel of interest itself.

The addition circuit 49 adds the peripheral emission energy represented by the first and second sums Σ1, Σ2, and outputs a sum Σ representing the total peripheral emission energy that would be received by the pixel of interest if the LEDs were to be driven according to the optical energies ES(y)(x), including both the standard peripheral emission energy and deviations from the peripheral emission energy. The sum Σ indicates the effect of all pixels on the pixel of interest according to the energy emission distribution Ded.

The subtraction circuit 37 subtracts the sum Σ obtained in the addition circuit 49 from the optical energy ET(y)(x) to remove the effect of the pixel of interest itself. The result (ET(y)(x)−Σ) is divided by the deviation data ΔW(indx)(y)(x) in the division circuit 38, and then added to the optical energy ES(y)(x) in the addition circuit 39 to obtain the adjusted intended optical energy level EX(y)(x), which is given by the following equation:

$$EX(y)(x)=ES(y)(x)+(ET(y)(x)-\Sigma)/\Delta W(\text{indx})(y)(x)$$

Next, the process by which the optimum value of the optical energy EX(4)(4) for an LED is calculated from the pixel data pix(4)(4) will be described.

The image data output from the image data output unit 11 in FIG. 8 are received and stored sequentially in the image data line buffer 24. When the first five lines of data on a page (Dt1-Dt5) have been received as shown in FIG. 15, to calculate the optimum optical energy for LED No. 0 in the first line (Dt1), the image data line buffer 24 sends index number four (indx=4) to the distribution deviation register file 45. The distribution deviation register file 45 then generates the corresponding energy emission distribution deviation ΔD, which is sent to the optical energy calculation circuit 42 and stored in the distribution deviation matrix buffer 46 in FIG. 37.

The data in the matrix in FIG. 15 are transferred to the image data matrix buffer 25, converted to energy data by the data/energy conversion table 26, and supplied to the optical energy calculation circuit 42, which stores the energy data in the optical energy matrix buffer 35 in FIG. 37. The optical energy calculation circuit 42 computes the optimum optical energy value EX(4)(4) of LED No. 0 by adjusting the intended value ES(4)(4) as described above.

$$EX(4)(4)=ES(4)(4)+(ET(4)(4)-\Sigma)/W(0)(4)(4)$$

The sum Σ is given by the following equation:

$$\Sigma=\Sigma 1+\Sigma 2$$

where the first and second sums Σ1, Σ2 are calculated as follows.

$$\sum 1 = \sum_{y=0}^{8}\sum_{x=0}^{8}(Wst(x-4)(8-y)(8-x)\times ES(y)(x))$$

$$\sum 2 = \sum_{y=0}^{8}\sum_{x=0}^{8}(\Delta W(x-4)(8-y)(8-x)\times ES(y)(x))$$

The first sum Σ1 includes the standard contributions of the peripheral LEDs when the LED of interest is driven according to image data pix(4)(4), as calculated from the standard energy emission distributions Dst. The second sum Σ2 includes the sum of the deviations from these standard contributions when the LED of interest is driven according to image data pix(4)(4), as calculated from the deviations data ΔD.

As described above, in this embodiment, the second sum Σ2 is calculated on the basis of the deviation data ΔW(indx)(y)(x) of the energy emission distribution deviation ΔD, and then the optimum EX(4)(4) is obtained. The deviation data ΔW(indx)(y)(x) may have positive or negative values, even if truncation is performed in the calculation of ΔW(indx)(y)(x). Therefore, when the second sum Σ2 indicating the sum of the energy emission distribution deviation is calculated, the rounding errors are prevented from accumulating in the direction that would reduce the second sum Σ2. The accuracy of the second sum Σ2 can thereby be improved.

The first sum Σ1 is calculated on the basis of the data Wst(indx)(y)(x) of the standard energy emission distribution Dst. Since the data Wst(indx)(y)(x) is obtained by averaging the data W(indx)(y)(x) of the LEDs, the resulting averages compensate for the errors included in the data W(indx)(y)(x) of the LEDs. Therefore, the accuracy of the first sum Σ1 can also be improved.

The above-described improvement in the accuracy of the first and second sums Σ1, Σ2 improves the quality of the printed image.

The errors in the data ΔW(indx)(y)(x) increase as the bit length of the distribution deviation register file 45 is reduced, but since these errors do not tend to accumulate in the second sum Σ2, it is possible to reduce the bit length and thereby the size of the distribution deviation register file 45, thus reducing the cost of the image forming apparatus.

Figure 38:
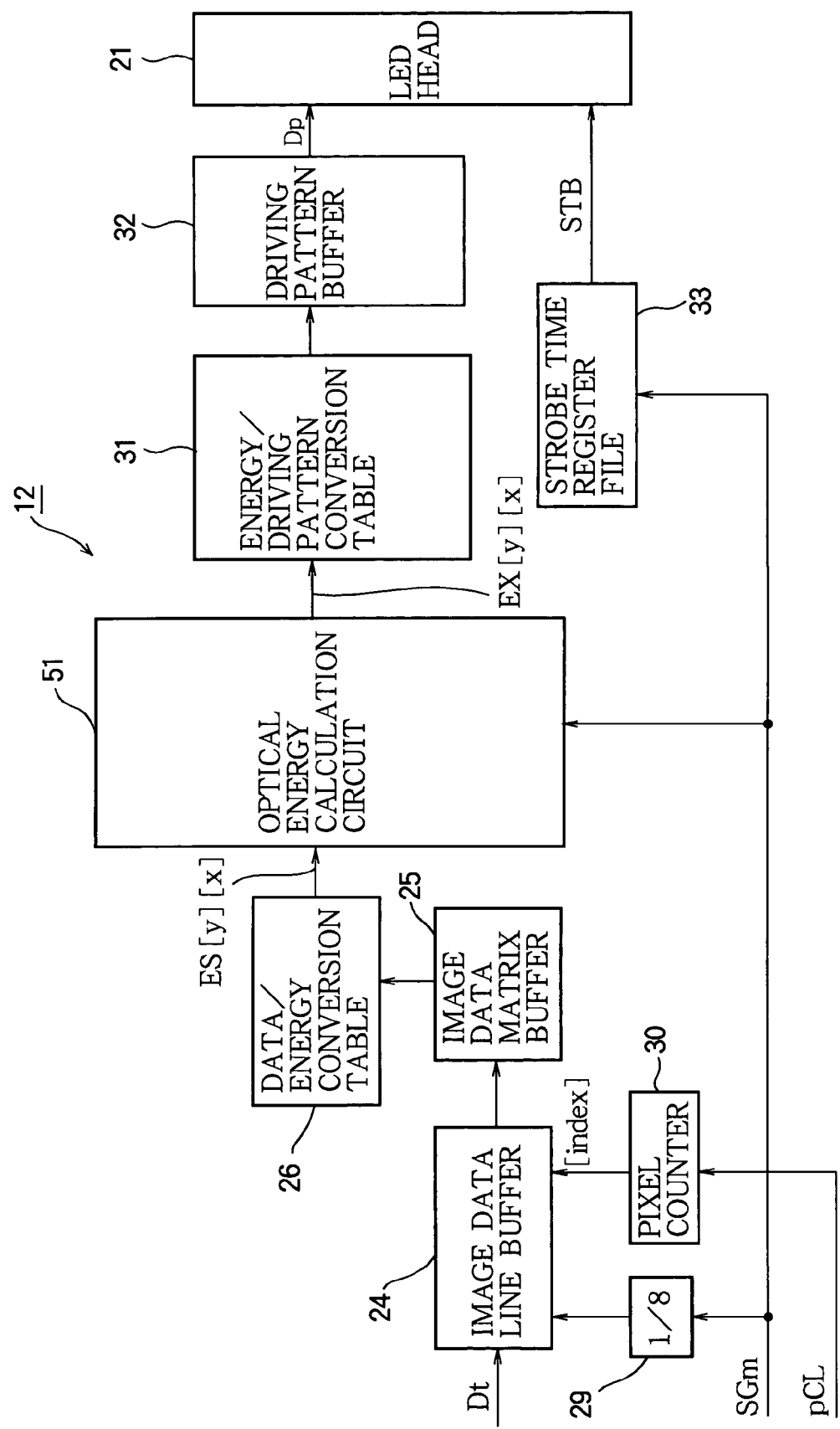
FIG. 38 is a block diagram of the LED driving circuit in a seventh embodiment of the invention.
Figure 39:
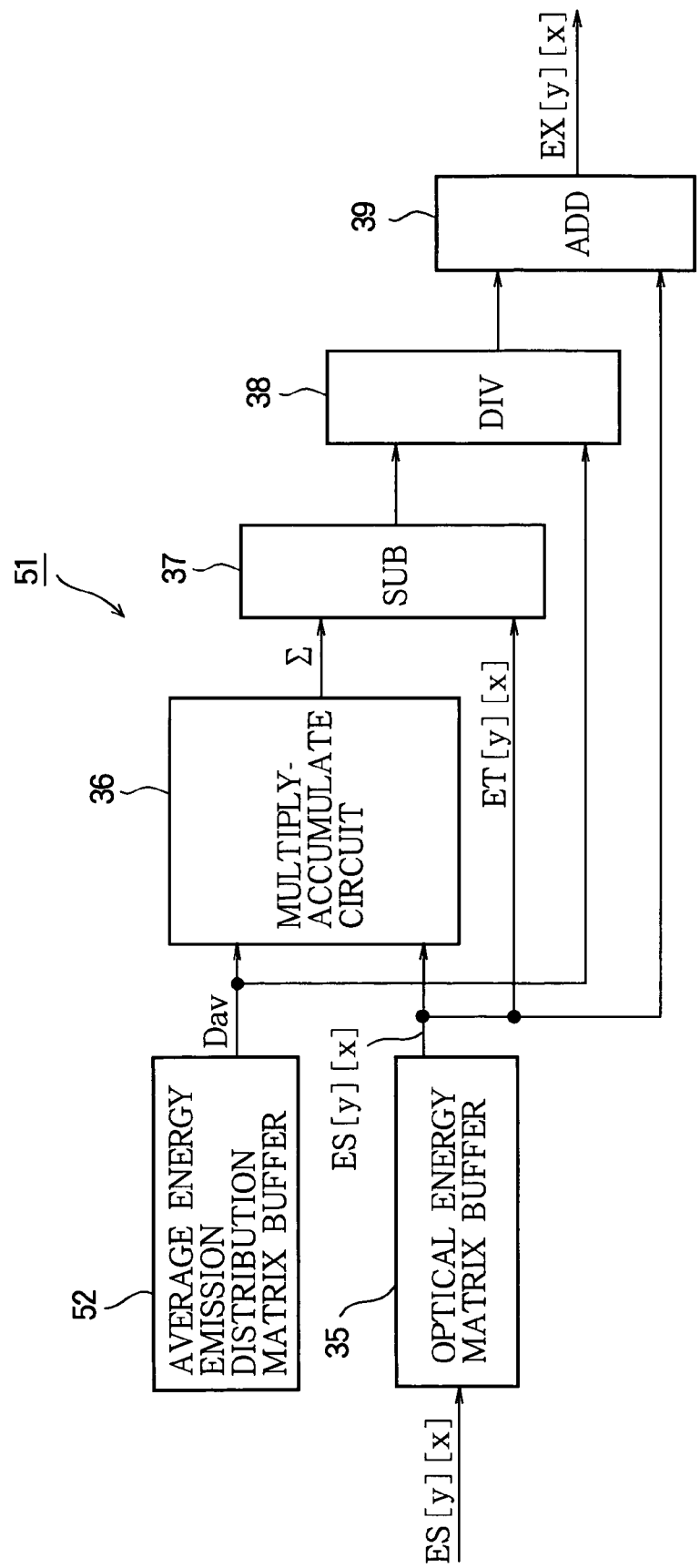
FIG. 39 is a block diagram of the optical energy calculation circuit in the seventh embodiment.

Next, a seventh embodiment will be described with reference to FIGS. 38 to 40. FIG. 38 is a block diagram of the LED driver circuit; FIG. 39 is a block diagram of the optical energy calculation circuit; and FIG. 40 shows an example of an average energy emission distribution.

In the seventh embodiment, as shown in FIG. 39, the optical energy calculation circuit 51 comprises an optical energy matrix buffer 35, a multiply-accumulate circuit 36, a subtraction circuit 37, a division circuit 38, an addition circuit 39, and an average energy emission distribution matrix buffer 52.

The average energy emission distribution matrix buffer 52 stores a representative average energy emission distribution Dav, which forms a 7×7 matrix of data W(y)(x) The data W(y)(x) are obtained by averaging the energy emission distribution data W(indx)(y)(x) of all the LEDs installed in the LED head 21. The averaging is performed over all illumination positions (y)(x).

Next, the process by which the optimum value of the optical energy EX(3)(3) for an LED is calculated from the pixel data pix(3)(3) will be described. FIG. 41 indicates the state of the average energy emission distribution matrix buffer 52 in FIG. 39.

The image data output from the image data output unit 11 in FIG. 8 are received and stored sequentially in the image data line buffer 24. FIG. 21 shows the state in which data for the first four lines of image data on a page (Dt1-Dt4) have been received.

To calculate the optimum energy when LED No. 0 is driven to form the first pixel in the first line, the 7×7 matrix of pixel values pix(y)(x) indicated by the thick lines in FIG. 21 is transferred to the image data matrix buffer 25.

The data in the matrix in FIG. 21 are converted to energy data by the data/energy conversion table 26 and supplied to the optical energy calculation circuit 51, which computes the optimum optical energy value EX(3)(3) of LED No. 0 by adjusting the intended value ES(3)(3) as explained in the second embodiment.

$$EX(3)(3) = ES(3)(3) + (ET(3)(3) - \Sigma)/W(3)(3)$$

The quantity $\Sigma$ is calculated as follows.

$$\sum = \sum_{y=0}^{6} \sum_{x=0}^{6} (W(6-y)(6-x) \times ES(y)(x))$$

The value of $\Sigma$ includes both the optical energy produced when the LED of interest is driven according to image data pix(3)(3) and the peripheral optical energy contributed by peripheral LEDs, on the assumption that all of the LEDs have the average energy emission distribution Dav.

Referring to FIG. 22, during this calculation, the optical energy matrix buffer 35 stores the image data pix(y)(x) for the peripheral pixels as well as the data pix(3)(3). The solid arrow, dotted arrow, and dot-dash arrow indicate that some part of the optical energy corresponding to pix(0)(0), pix(3)(0), and pix(6)(0) is contributed to the central pixel in the matrix. These contributions are proportional to the energy emission distribution data W(6)(6), W(3)(6), and W(0)(6), as indicated by the cells in FIG. 41 outlined in corresponding thick solid lines, dotted lines, and dash-dot lines.

As described above, since it suffices for the average energy emission distribution matrix buffer 52 to store a single energy emission distribution, the capacity of the average energy emission distribution matrix buffer 52 can be reduced, and the cost of the image forming apparatus can be reduced accordingly. In particular, this embodiment is effective in image forming apparatus using single-shot lasers.

Next, the operation of the seventh embodiment will be described with reference to a numerical example shown in FIGS. 42 to 46. FIG. 42 indicates the state of the image data line buffer 24 in FIG. 38; FIG. 43 shows the image data in area AR1 in FIG. 42 converted to optical energy data; FIG. 44 indicates the contents of the average energy emission distribution matrix buffer 52 in FIG. 39; FIG. 45 illustrates the calculation of peripheral optical energy on the basis of the information in FIGS. 43 and 44; and FIG. 46 shows an example of calculated optimum optical energies.

When the image data Dt having the gray levels shown in FIG. 42 are stored in the image data line buffer 24 in FIG. 38, the image data in the area AR1 outlined by a thick line in FIG. 42 are converted by the data/energy conversion table 26 into the optical energy levels ES(y)(x) shown in FIG. 43. The area AR1 is located in the upper left corner of a solid black area printed on a white background.

Next, the process by which the optimum optical energy EX(4)(4) is calculated from the pixel data pix(4)(4) for pixel p1 in the upper left corner in area AR1 will be described. The cells in FIG. 42 outlined in dotted lines are not used in this calculation described below.

When the data W(y)(x) of the average energy emission distribution Dav have the values given in FIG. 44 and the pixel at position p1 is the pixel of interest, the components of the illumination received by this pixel, which are calculated as W(6−y)(6−x)×ES(y)(x), for different values of x and y, have the values shown in FIG. 45. These components indicate the effect of surrounding cells on the pixel of interest, and their total sum $\Sigma$ has approximately the following value.

$$\Sigma = 4.554 \text{ pJ}$$

Since the intended optical energy ES(4)(4) is six picojoules as shown in FIG. 43, the optimum optical energy EX(4)(4) is calculated as follows.

$$EX(4)(4) = ES(4)(4) + \left(ET(4)(4) - \sum\right) \Big/ W(4)(4)$$
$$= 6.0 + (6.0 - 4.554)/0.622$$
$$\approx 8.325 \text{ pJ}$$

This value is shown in the top left corner cell in FIG. 46. The other values in FIG. 46 are calculated similarly.

Figure 54:
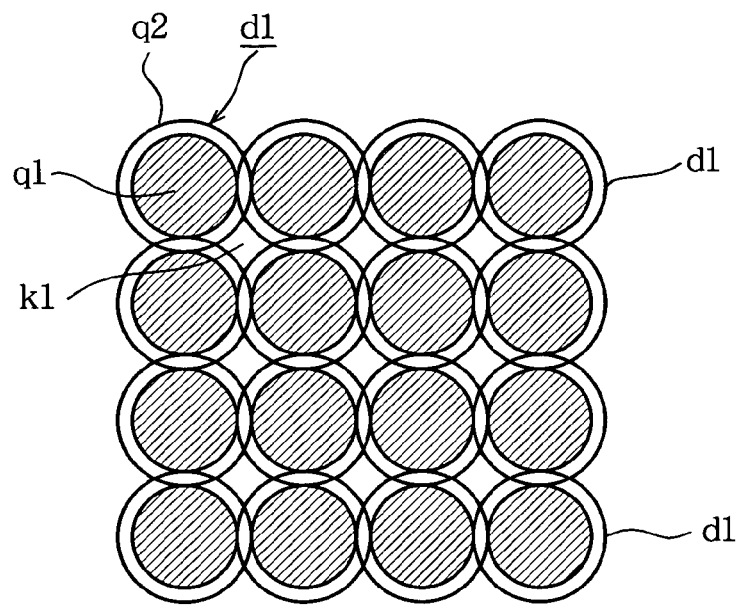
FIG. 54 schematically illustrates dots printed by a conventional image forming apparatus.
Figure 55:
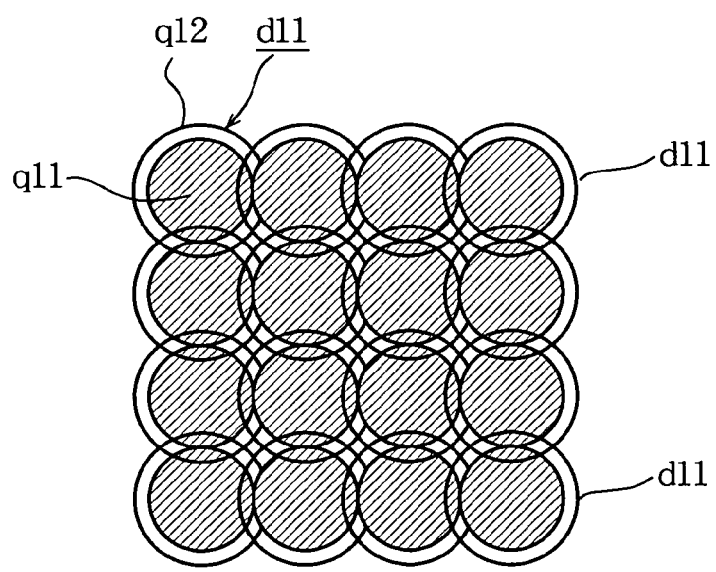
FIG. 55 schematically illustrates dots printed by the second embodiment.

Next, a numerical example will be given for the second embodiment with reference to FIGS. 47 to 55. In this example there exist large variations in the shapes of the energy emission distributions Ded of the LEDs. FIGS. 47 and 48 show first and second exemplary energy emission distributions; FIGS. 49 and FIG. 52 illustrate the use of these distributions to calculate the optical energy received by two different pixels; FIG. 50 shows the state of the image data line buffer 24 in FIG. 9; FIG. 51 shows an example of the optical energy data obtained by conversion of the image data; FIG. 53 shows an example of optimum optical energy values; FIG. 54 schematically illustrates the result of conventional printing; and FIG. 55 schematically illustrates the result of printing according to the second embodiment.

It will be assumed that LEDs No. 0 to 2 have the energy emission distribution Ded shown in FIG. 47, and LED No. 3 has the energy emission distribution shown in FIG. 48. The distribution in FIG. 47 is symmetrically centered at the central cell of the matrix; the distribution in FIG. 48 is off-center. This type of off-center distribution tends to occur at, for example, at the joints between LED array chips.

As in the seventh embodiment, when the image data Dt having the gray levels shown in FIG. 42 are stored in the image data line buffer 24 in FIG. 9, the image data in area AR1 in FIG. 42 are converted by the data/energy conversion table 26 into the optical energy levels ES(y)(x) shown in FIG. 43.

Next, the process by which the optimum optical energy EX(4)(4) for the pixel data pix(4)(4) located at position p1 in the upper left corner of area AR1 will be described.

The optical energy received by the pixel at position p1 in FIG. 42 has components W(x −3)(6−y)(6−x)×ES(y)(x), which are calculated using the data W(0)(y)(x) from FIG. 47 when x is equal to 3, 4, or 5 and the data W(3)(y)(x) from FIG. 48 when x is equal to 6. The calculations are shown in FIG. 49. The sum Σ of the components in FIG. 49 has approximately the following value:

$$\Sigma = 4.54 \text{ pJ}$$

Since the intended optical energy ES(4)(4) is six picojoules as shown in FIG. 51, the optimum optical energy EX(4)(4) is calculated as follows.

$$EX(4)(4) = ES(4)(4) + \left(ET(4)(4) - \sum\right) \Big/ W(4)(4)$$
$$= 6.0 + (6.0 - 4.54)/0.622$$
$$\approx 8.347 \text{ pJ}$$

Similarly, when the image data Dt having the gray levels shown in FIG. 50 are stored in the image data line buffer 24 in FIG. 9, the image data in area AR2 in FIG. 50 are converted by the data/energy conversion table 26 into the optical energy levels ES(y)(x) shown in FIG. 51. Area AR2 is also located in the upper left corner of a solid black area on a white background.

Next, the process by which the optimum value of the optical energy EX(4)(4) for the pixel data pix(4)(4) located at position p2 in area AR2 will be described. LEDs No. 0-2 and 4-6 are assumed to have the energy emission distribution shown in FIG. 47; LED No. 3 is assumed to have the energy emission distribution shown in FIG. 48. The cells in FIG. 50 outlined in dotted lines are not used in this calculation.

In this case, the components of the optical energy received by the pixel at position p2 are calculated as shown in FIG. 52 from the formula W(x)(6−y)(6−x)×ES(y)(x), using the data W(0)(y)(x) and W(3)(y)(x) from FIGS. 47 and 48. The total sum Σ of the components has approximately the following value.

$$\Sigma = 4.39 \text{ pJ}$$

Since the intended optical energy ES(4)(4) is six picojoules as shown in FIG. 51, the optimum optical energy EX(4)(4) is calculated as follows.

$$EX(4)(4) = ES(4)(4) + \left(ET(4)(4) - \sum\right) \Big/ W(4)(4)$$
$$= 6.0 + (6.0 - 4.39)/0.510$$
$$\approx 9.16 \text{ pJ}$$

Since the optical energy EX(y)(x) is adjusted in this way, whereas pixels d1 of different sizes would be formed by conventional image forming apparatus as shown in FIG. 54, pixels d11 of uniform size are formed by the present invention as shown in FIG. 55. In FIG. 54, where the central parts q1 of a group of pixels overlap only the outer peripheral parts q2 of the adjacent pixels, gaps k1 are left in what should be a solid black printed area. In the present invention, as shown in FIG. 55, after compensation for peripheral optical energy, both the central and peripheral parts q11 and q12 of adjacent pixels d11 overlap, so no gaps are left, which leads to the desired solid black printing.

The above embodiments have been described in relation to an LED printer, but the present invention can also be practiced in other types of electrophotographic printers, including laser printers and liquid crystal printers, to prevent degradation of printing quality by peripheral optical energy. Energy emission distribution data for different exposure levels may be calculated in advance.

The calculation of and compensation for peripheral optical energy is carried out by specialized hardware circuits in the preceding embodiments, but these computational processes can also be carried out by software running on a general-purpose processor.

Those skilled in the art will recognize that further variations are possible within the scope of the invention, which is defined in the appended claims.

What is claimed is:

1. An image forming apparatus for forming pixels by illuminating a pixel formation member with optical energy emitted by a light emitting unit according to image data, the image forming apparatus comprising:
   a calculation unit for calculating peripheral optical energy received by a pixel of interest on the pixel formation member by determining and adding up the optical energy emitted to form individual pixels two-dimensionally surrounding the pixel of interest but received instead by the pixel of interest;
   a compensation unit for adjusting the optical energy emitted to form the pixel of interest according to said peripheral optical energy; and
   an energy emission distribution memory for storing an energy emission distribution representing a distribution of optical energy emitted by the light emitting unit and received at a two-dimensional array of pixel positions; wherein
   the calculation unit calculates the optical energy emitted to form the individual pixels two-dimensionally surrounding the pixel of interest but received instead by the pixel of interest from the energy emission distribution; and
   the energy emission distribution is stored as a matrix in the energy emission distribution memory, the matrix having a size determined according to specifications of the image forming device, the matrix excluding an area over which the optical energy received adds up to less than one gray level in a gray scale used by the image forming apparatus; and
   the matrix has a minimum size such that peripheral optical energy excluded from the matrix corresponds in total to less than one gray level of the pixel of interest.

2. The image forming apparatus of claim 1, wherein the pixel formation member is a photosensitive member, and the light emitting unit forms a latent electrostatic image by exposing the photosensitive member to light.

3. The image forming apparatus of claim 1, wherein the light emitting unit comprises a plurality of light emitting elements, and the energy emission distribution memory stores a separate energy emission distribution for each light emitting element in the light emitting unit.

4. The image forming apparatus of claim 1, wherein the light emitting unit comprises a plurality of light emitting elements, and the energy emission distribution memory stores a plurality of energy emission distributions, the number of energy emission distributions stored in the energy emission distribution memory being less than the number of light emitting elements in the light emitting unit, the image forming apparatus further comprising an index data unit for assigning one of the energy emission distributions to each light emitting element in the light emitting unit.

5. The image forming apparatus of claim 1, wherein the energy emission distribution is stored in the energy emission distribution memory as a matrix of data values, each data value indicating optical energy received by one pixel.

6. The image forming apparatus of claim 5, wherein the energy emission distribution is stored in the energy emission distribution memory as a matrix of data values, the matrix including a plurality of outermost data values, each outermost data value indicating optical energy received by a plurality of pixels.

7. The image forming apparatus of claim 1, wherein the light emitting unit comprises a plurality of light emitting elements, the image forming apparatus further comprising:
- a standard energy emission distribution memory for storing a standard energy emission distribution; and
- a deviation memory for storing data representing deviations of the energy emission distributions of the light emitting elements in the light emitting unit from the standard energy emission distribution;
- wherein the calculation unit calculates the peripheral optical energy from the standard energy emission distribution and the data representing deviations.

8. An image formation method, comprising:
- illuminating a pixel formation member with optical energy emitted according to image data to form pixels;
- calculating peripheral optical energy received by a pixel of interest on the pixel formation member by determining and adding up the optical energy emitted to form individual pixels two-dimensionally surrounding the pixel of interest but received instead by the pixel of interest; and adjusting the optical energy emitted to form the pixel of interest according to said peripheral optical energy; and
- storing an energy emission distribution representing a distribution of optical energy emitted by the light emitting unit and received at a two-dimensional array of pixel positions; wherein
- the energy emission distribution is stored as a matrix having a size determined according to specifications of the image forming device, the matrix excluding an area over which the optical energy received adds up to less than one gray level in a gray scale used by the image forming apparatus; and
- the matrix has a minimum size such that peripheral optical energy excluded from the matrix corresponds in total to less than one gray level of the pixel of interest.

9. The image formation method of claim 8, further comprising storing data indicating how optical energy emitted to illuminate the pixel formation member is distributed over a two-dimensional array of pixel positions, the optical energy emitted to form the individual pixels two-dimensionally surrounding the pixel of interest but received instead by the pixel of interest being calculated from the stored energy emission distribution.

10. The image formation method of claim 8, wherein illuminating the pixel formation member with optical energy includes using a plurality of light emitting elements, the method further comprising:
- storing a matrix of data indicating a standard energy emission distribution; and
- storing data representing deviations of energy emission distributions of the light emitting elements from the standard energy emission distribution.

11. The image forming apparatus of claim 1, wherein the compensation unit reduces the optical energy supplied to form the pixel of interest by an amount equal to the calculated peripheral optical energy.

12. The image forming apparatus of claim 1, wherein the energy emission distribution memory stores an auxiliary matrix obtained from said matrix by additively combining an outermost peripheral area of said matrix into an outermost peripheral area one pixel wide in the auxiliary matrix, thus reducing the auxiliary matrix in size by two rows and two columns as compared with said matrix, and the calculation unit calculates the peripheral optical energy from the auxiliary matrix.

* * * * *